US009279716B2

(12) United States Patent
Snider et al.

(10) Patent No.: US 9,279,716 B2
(45) Date of Patent: Mar. 8, 2016

(54) ACOUSTIC COIN SENSOR

(71) Applicant: MEI, Inc., Malvern, PA (US)

(72) Inventors: John D. Snider, West Chester, PA (US);
Edward M. Zoladz, Jr., West Chester,
PA (US); Christopher S. Carmine,
Thornton, PA (US)

(73) Assignee: Crane Payment Innovations, Inc.,
Malvern, PA (US)

(*) Notice: Subject to any disclaimer, the term of this
patent is extended or adjusted under 35
U.S.C. 154(b) by 367 days.

(21) Appl. No.: 13/887,482

(22) Filed: May 6, 2013

(65) Prior Publication Data

US 2013/0298679 A1 Nov. 14, 2013

Related U.S. Application Data

(60) Provisional application No. 61/644,280, filed on May 8, 2012.

(51) Int. Cl.
| | | |
|---|---|---|
| *G01H 15/00* | (2006.01) | |
| *G01S 15/10* | (2006.01) | |
| *G07D 3/14* | (2006.01) | |
| *G07D 9/04* | (2006.01) | |
| *G01S 7/521* | (2006.01) | |

(52) U.S. Cl.
CPC ............... *G01H 15/00* (2013.01); *G01S 7/521*
(2013.01); *G01S 15/10* (2013.01); *G07D 3/14*
(2013.01); *G07D 9/04* (2013.01)

(58) Field of Classification Search
CPC ........... G01S 7/521; G01S 15/10; G07D 9/04;
G07D 3/14; G01H 15/00

USPC .............................................................. 73/589
See application file for complete search history.

(56) References Cited

U.S. PATENT DOCUMENTS

| | | | | |
|---|---|---|---|---|
| 4,704,030 | A * | 11/1987 | Steen et al. | 356/121 |
| 4,880,097 | A * | 11/1989 | Speas | 194/239 |
| 5,092,816 | A * | 3/1992 | Levasseur | 453/17 |
| 5,577,957 | A * | 11/1996 | Hoormann et al. | 453/17 |
| 5,607,350 | A * | 3/1997 | Levasseur et al. | 453/17 |
| 5,651,444 | A * | 7/1997 | Walker et al. | 194/317 |
| 7,195,113 | B2 * | 3/2007 | Furneaux | 194/215 |
| 7,477,053 | B2 * | 1/2009 | Pinsky et al. | 324/261 |
| 7,699,689 | B2 * | 4/2010 | Furneaux et al. | 453/16 |
| 2002/0113745 | A1 * | 8/2002 | Strickland | 343/786 |
| 2003/0051970 | A1 * | 3/2003 | Furneaux et al. | 194/200 |

FOREIGN PATENT DOCUMENTS

| | | |
|---|---|---|
| DE | 4301550 A1 | 7/1994 |
| DE | 202006002839 U1 | 7/2006 |
| EP | 351050 * | 1/1990 |
| EP | 1413991 A1 | 4/2004 |
| GB | 278098 A | 10/1927 |
| GB | 2222354 * | 2/1990 |
| GB | 2357617 A | 6/2001 |

* cited by examiner

*Primary Examiner* — J M Saint Surin

(57) ABSTRACT

The present subject matter relates to a capacity detector, a waveguide and a manifold for use with a coin sensor as well as methods for sensing a capacity of a coin receptacle. In one aspect, the waveguide for use with a coin sensor comprises an excitation end for receiving an acoustic signal, a horn end for disposition adjacent to a coin receptacle, and a conduit interconnecting the horn end and the excitation end. In embodiments, the horn end of the waveguide may define a horn selected from a tapered horn, an exponential horn, a tractrix horn, or a modified tractrix horn.

26 Claims, 20 Drawing Sheets

ACOUSTIC COIN SENSOR

RELATED APPLICATIONS

This application claims priority to U.S. Provisional Patent Application No. 61/644,280 filed May 8, 2012, the entire contents of which is hereby incorporated by reference.

FIELD OF DISCLOSURE

This disclosure relates to apparatus and methods of sensing the capacity of storage devices, and particularly, coin tubes.

BACKGROUND

Coin receptacles (e.g. coin tubes) can be used to store coins in a currency handling apparatus. Various techniques can be used to measure the available capacity for a coin tube to store additional coins.

For example, in some implementations, a processor can compute the available capacity of a coin tube by comparing a running count of the quantity of coins inserted into the coin tube against a predetermined quantity of coins that the receptacle is known to be capable of storing. The processor can use the computed available capacity to determine whether to stop accepting coins of a particular denomination and/or whether servicing is required.

This approach is predicated on an assumption that the stored coins have a fixed dimension (e.g. thickness). Such an assumption can result an inaccurate computation of the available capacity because the coin dimensions can vary for various reasons (e.g. manufacturing tolerances, environmental conditions, etc.). Inaccurately computing the available capacity can result in underfill or overfill of the receptacle. Overfilling or underfilling of the receptacle can lead to jams and/or downtime of the currency handling apparatus.

This approach also relies on an assumption that the coins will always be received and stored in a pre-determined orientation (e.g. stacked face-to-face). To the extent that the coins are not received and stacked in the pre-determined orientation, it is possible for the coin tube to reach or exceed maximum capacity prior to receiving the predetermined quantity of coins. For example, coins or foreign objects lodged within the coin tube can prevent subsequently inserted coins from being stacked in the pre-determined orientation, which can potentially cause the coin receptacle to reach or exceed the maximum capacity prior to receiving the predetermined quantity of coins. In this situation, the processor may not detect the overflow event, resulting in overflow of the coin tube and malfunction of the currency handling apparatus.

Ultrasonic pulses can also be used to measure the available capacity of a coin receptacle. In some implementations, ultrasonic pulses can be directed towards the top of a coin stack, and the time delay between the emitted and reflected pulses can be measured. However, ultrasonic transducers are resonant structures that produce ringing, and are therefore difficult to construct. Moreover, while damping can be used to reduce the ringing, such damping also has the negative effect of reducing the output power and can lead to potential noise problems. Also, it may be necessary to space such an ultrasonic transducer a large distance from the stack of coins to avoid detection of the reflected pulse occurring prior to a complete detection of the emitted pulse. Furthermore, if a substantial portion of the transducer output is coupled to the surrounding structure, this can result in saturation of the receiving microphone.

Therefore, there exists a need for a more efficient, smaller form-factor, high-accuracy capacity detector that can determine the available capacity of a coin tube.

SUMMARY

The present subject matter relates to a capacity detector for use in a coin sensor. The present subject matter also relates to a waveguide and a manifold for use with a coin sensor as well as methods for sensing a capacity of a coin receptacle In one aspect, a waveguide for use with a coin sensor comprises an excitation end for receiving an acoustic signal, a horn end for disposition adjacent to a coin receptacle, and a conduit interconnecting the horn end and the excitation end.

The horn end of the waveguide may define a horn selected from a tapered horn, an exponential horn, a tractrix horn, or a modified tractrix horn. Further, the horn end radius may expand gradually to reduce the instantaneous change in acoustic impedance presented to the acoustic signal as it traverses through and exits the waveguide. Additionally or alternatively, the horn end may be configured to minimize internal reflection of the acoustic signal.

In another aspect, which may be used in combination with any of the above aspects, the horn end of the waveguide may be a tractrix horn or a modified tractrix horn having a mouth end radius of 3-20 mm. The horn end may comprise a mouth end having a radius $r_0$. The horn end radius $r_d$ at a given displacement d with respect to the mouth end may be given by the formula $$d = r_0 \times \ln\left(\frac{r_0 + \sqrt{r_0^2 - r_d^2}}{r_d}\right) - \sqrt{r_0^2 - r_d^2}.$$

Embodiments of any of the above aspects may include one or more of the following features. The horn end of the waveguide may comprise a signal cavity configured to minimize an instantaneous acoustical impedance mismatch between the waveguide impedance and the coin receptacle. The horn end may also comprise a signal cavity, wherein at least a portion of the cavity varies according to an exponential function. Alternatively or additionally, the horn end may comprise a signal cavity having a taper angle θ, a mouth end radius $r_0$, and an inner radius $r_d$ which varies at a given displacement d with respect to the mouth end according to the formula given by $$r_d = r_0 - \frac{d}{\tan\theta}.$$

In yet another aspect which may also be applied in combination with the above aspects, the excitation end of the waveguide may be disposed proximate to a spark gap for generating the acoustic signal. The acoustic signal may be generated by a spark and/or the acoustic signal may comprise a broadband pulse.

In some embodiments of any of the above aspects, the waveguide may be configured to couple the acoustic signal to a coin receptacle. The at least one waveguide material may comprise a plastic. The waveguide may have a −3 dB cutoff frequency.

According to another aspect, a manifold for use with a coin sensor comprises at least one waveguide comprising an excitation end for receiving an acoustic signal, a horn end, and a conduit interconnecting the horn end and the excitation end, wherein the manifold further comprises an excitation chamber for receiving and distributing the acoustic signal to the at least one waveguide excitation end.

The horn end of the manifold's waveguide may define a horn selected from a tapered horn, an exponential horn, a tractrix horn, or a modified tractrix horn. Further, the horn end radius may expand gradually to reduce the instantaneous change in acoustic impedance presented to the acoustic signal as it traverses through and exits the waveguide. Additionally or alternatively, the horn end may be configured to minimize internal reflection of the acoustic signal.

In another aspect, which may be used in combination with any of the above aspects, the horn end of the manifold's waveguide may be a tractrix horn or a modified tractrix horn having a mouth end radius of 3-20 mm. The horn end may comprise a mouth end having a radius $r_0$. The horn end radius $r_d$ at a given displacement d with respect to the mouth end may be given by the formula $$d = r_0 \times \ln\left(\frac{r_0 + \sqrt{r_0^2 - r_d^2}}{r_d}\right) - \sqrt{r_0^2 - r_d^2}.$$

Embodiments of any of the above aspects may include one or more of the following features. The horn end of the manifold's waveguide may comprise a signal cavity configured to minimize an instantaneous acoustical impedance mismatch between the waveguide impedance and the coin receptacle. The horn end may also comprise a signal cavity, wherein at least a portion of the cavity varies according to an exponential function. Alternatively or additionally, the horn end may comprise a signal cavity having a taper angle θ, a mouth end radius $r_0$, and an inner radius $r_d$ which varies at a given displacement d with respect to the mouth end according to the formula given by $$r_d = r_0 - \frac{d}{\tan\theta}.$$

In yet another aspect which may also be applied in combination with the above aspects, the excitation end of the manifold's waveguide may be disposed proximate to a spark gap for generating the acoustic signal. The acoustic signal may be generated by a spark and/or the acoustic signal may comprise a broadband pulse.

In some embodiments of any of the above aspects, the manifold's waveguide may be configured to couple the acoustic signal to a coin receptacle.

According to another aspect, a capacity detector for use in a coin sensor comprises a signal generator configured to transmit an acoustic signal, at least one waveguide, wherein each waveguide further comprises an excitation end for receiving the acoustic signal, a horn end, and a conduit interconnecting the horn end and the excitation end. The capacity detector further comprises a coin receptacle disposed adjacent to each horn end and configured to store a coin stack comprising at least one coin, wherein the transmitted acoustic signal is reflected by at least one surface within the coin receptacle thereby causing a reflected acoustic signal; an acoustic sensor configured to output measurement signals in response to receiving the transmitted or reflected acoustic signals; and a processor configured to compute at least one parameter of the coin receptacle in response to receiving the measurement signals.

The horn end of the detector's waveguide may define a horn selected from a tapered horn, an exponential horn, a tractrix horn, or a modified tractrix horn. Further, the horn end radius may expand gradually to reduce the instantaneous change in acoustic impedance presented to the acoustic signal as it traverses through and exits the waveguide. Additionally or alternatively, the horn end may be configured to minimize internal reflection of the acoustic signal.

In another aspect, which may be used in combination with any of the above aspects, the horn end of the detector's waveguide may be a tractrix horn or a modified tractrix horn having a mouth end radius of 3-20 mm. The horn end may comprise a mouth end having a radius $r_0$. The horn end radius $r_d$ at a given displacement d with respect to the mouth end may be given by the formula $$d = r_0 \times \ln\left(\frac{r_0 + \sqrt{r_0^2 - r_d^2}}{r_d}\right) - \sqrt{r_0^2 - r_d^2}.$$

Embodiments of any of the above aspects may include one or more of the following features. The horn end of the detector's waveguide may comprise a signal cavity configured to minimize an instantaneous acoustical impedance mismatch between the waveguide impedance and the coin receptacle. The horn end may also comprise a signal cavity, wherein at least a portion of the cavity varies according to an exponential function. Alternatively or additionally, the horn end may comprise a signal cavity having a taper angle θ, a mouth end radius $r_0$, and an inner radius $r_d$ which varies at a given displacement d with respect to the mouth end according to the formula given by $$r_d = r_0 - \frac{d}{\tan\theta}.$$

In yet another aspect which may also be applied in combination with the above aspects, the excitation end of the detector's waveguide may be disposed proximate to a spark gap for generating the acoustic signal. The acoustic signal may be generated by a spark and/or the acoustic signal may comprise a broadband pulse.

In some embodiments of any of the above aspects, the detector's waveguide may be configured to couple the acoustic signal to a coin receptacle.

Embodiments of any of the above aspects may include one or more of the following features. The at least one parameter may comprise a height of the stack and/or the at least one parameter may comprise the available capacity of the coin receptacle. Alternatively or additionally, the at least one parameter may comprise a distance between the at least one surface of the stack and the acoustic sensor.

In another aspect, which may be used in combination with any of the above aspects, the acoustic sensor may comprise a microphone. Further, the at least one surface may comprise a surface of the uppermost coin in the stack. Additionally or alternatively, the acoustic sensor may comprise an analog to digital converter configured to output digital measurement signals.

In yet another aspect, which may also be applied in combination with the above aspects, the processor of the detector may be configured to compute a time delay between the at transmitted and reflected signals. The computation of the at least one parameter may be based upon the time delay.

According to another aspect, a method of sensing a capacity of a coin receptacle comprises: transmitting an acoustic signal; coupling the acoustic signal to a coin receptacle wherein the coin receptacle is configured to store a coin stack comprising at least one coin; receiving samples of the acoustic signal and a return signal, wherein the return signal is generated in response to at least one surface within the coin receptacle reflecting the transmitted acoustic signal; and computing, via a processor, at least one parameter of the coin receptacle based upon a time delay between receiving the transmitted and return signals.

The acoustic signal may be coupled to the coin receptacle through a waveguide comprising an excitation end for receiving an acoustic signal, a horn end for disposition adjacent to a coin receptacle, and a conduit interconnecting the horn end and the excitation end. The waveguide, in particular the waveguide's horn and horn end used in combination with the method may include one or more of the aspects described above with respect to the waveguide, the manifold and the capacity detector. Additionally or alternatively, the acoustic signal may be generated by a spark and/or the acoustic signal may comprise a broadband pulse. Further, the at least one computed parameter may comprise a height of the stack, the available capacity of the coin receptacle and/or a distance between the at least one surface of the stack and the acoustic sensor.

Embodiments of any of the above aspects of the method may include one or more of the following features. The acoustic signals may be received from an acoustic sensor. The acoustic sensor may comprise a microphone. The acoustic sensor may comprise an analog to digital converter configured to output digital measurement signals. The at least one surface may comprise a surface of the uppermost coin in the stack. The processor may be configured to compute a time delay between the transmitted and reflected signals and the computation of the at least one parameter may be based upon the time delay.

According to another aspect, a waveguide comprises an end terminated with a tratrix horn.

These and other features of the present subject matter are described in detail below in combination with the accompanying drawings. Further features and advantages will be apparent from the description and drawings, and from the claims.

DETAILED DESCRIPTION

An efficient, smaller form-factor, high-accuracy capacity detector is disclosed herein. In one aspect, the capacity detector can comprise a waveguide, which itself comprises an excitation end for receiving an excitation signal, a horn end for disposition adjacent to a coin receptacle, and a conduit interconnecting the excitation and horn ends.

As used in this disclosure the term "coin" is employed to mean any coin (whether valid or counterfeit), token, slug, washer, or other metallic object or item, and especially any metallic object or item which could be utilized by an individual in an attempt to operate a coin-operated device or system. A "valid coin" is considered to be an authentic coin, token, or the like, and especially an authentic coin of a monetary system or systems in which or with which a coin-operated device or system is intended to operate and of a denomination which such coin-operated device or system is intended selectively to receive and to treat as an item of value.

Figure 1:
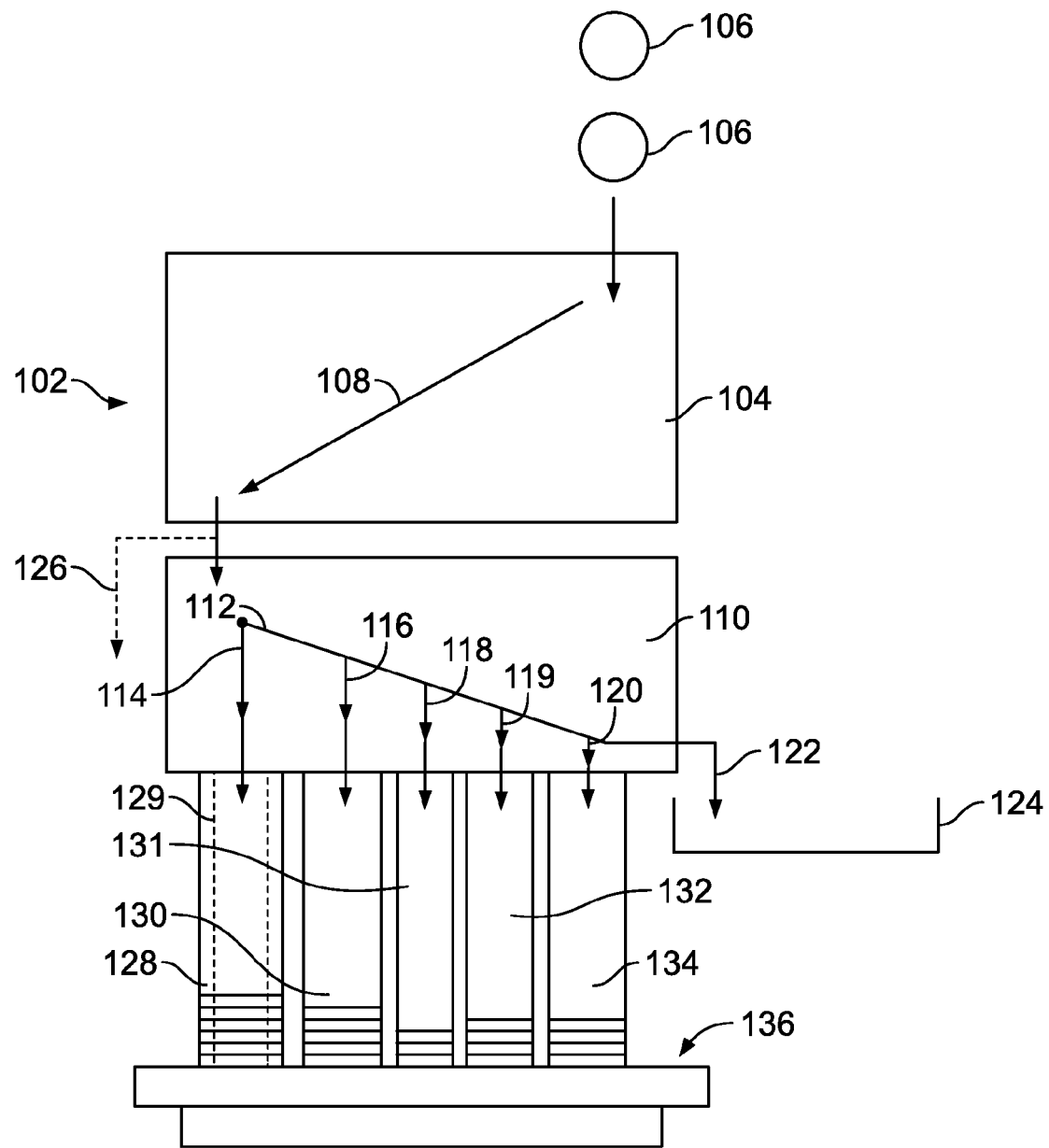
FIG. 1 is a schematic diagram of a currency handling apparatus according to an embodiment.

In some implementations, as shown in FIG. 1, a currency handling apparatus 102 can include a coin validator 104 for receiving one or more coins 106. During the passage of a coin 106 along a path 108 in the validator 104, the validator 104 can provide signals indicating whether or not the coins 106 are acceptable, and if so, the denomination of the coins 106.

Acceptable coins then enter a coin separator 110, which can have a number of gates (not shown) controlled by the circuitry of the apparatus for selectively diverting the coins 106 from a main path 112, into any number of further paths 114, 116, 118, 119, and 120, or alternatively, allowing the coins 106 to proceed to a path 122 leading to a cashbox 124. If the received coin 106 is deemed to be unacceptable, they can be led straight to a reject slot via a path 126 instead of entering the separator 110.

Each of the paths 114, 116, 118, 119, and 120 can lead to an associated coin receptacle 128, 130, 131, 132, and 134 respectively. In some implementations, each of the receptacles can be configured to store a vertical stack of coins of a particular denomination. In one aspect, a dispenser indicated schematically at 136, can be configured to dispense coins from a selected receptacle when change is to be given by the apparatus.

However, it should be noted that the coin receptacles can also be configured to store coins in other orientations (i.e. non-vertically stacked orientations) without departing from the spirit and scope of the present disclosure. It should also be understood that while each of the receptacles shown is configured to store coins of a particular denomination, any one of the coin receptacles can be used to store coins of mixed denominations.

Figure 2:
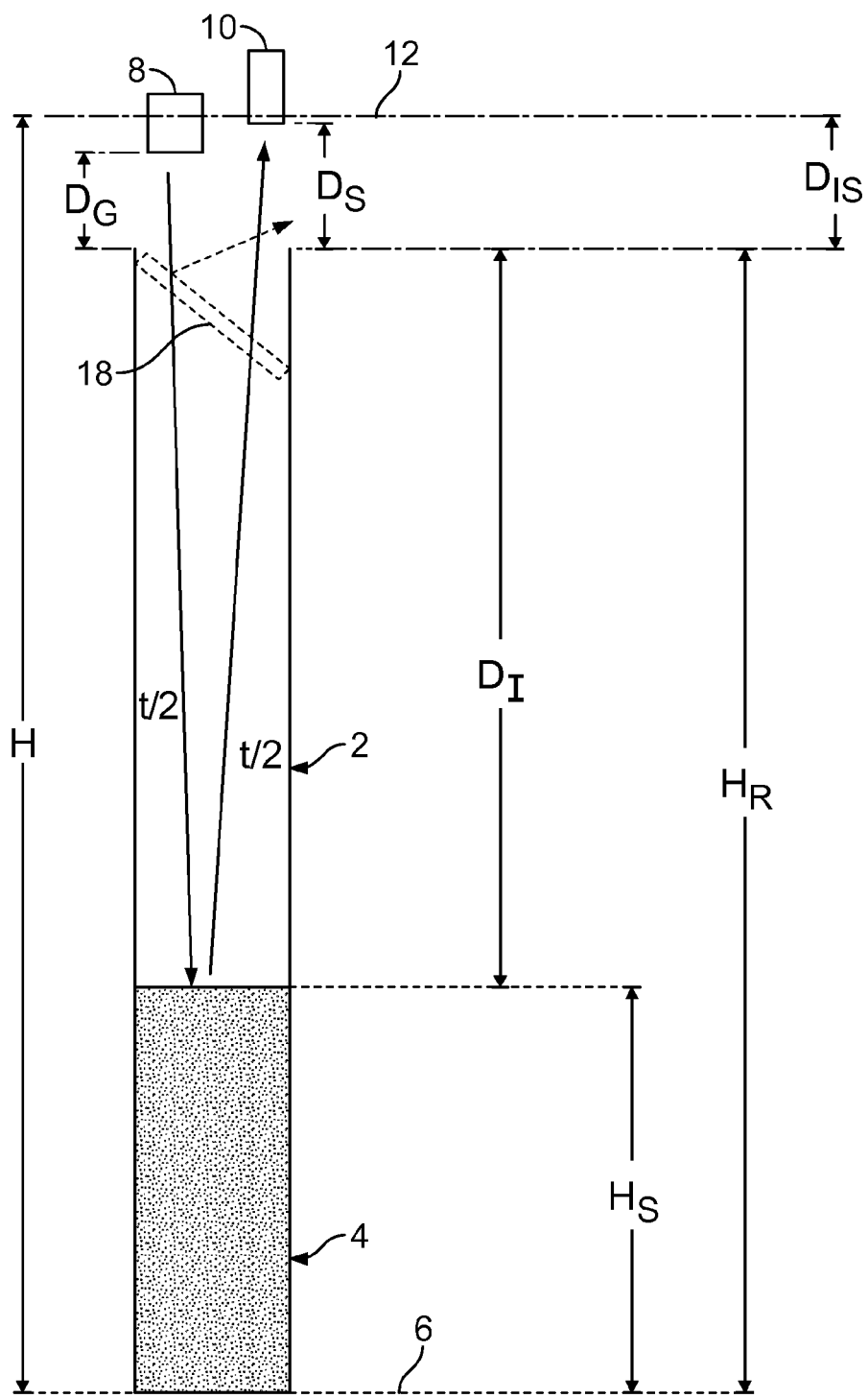
FIG. 2 is a schematic view of a coin receptacle of the apparatus of FIG. 1, which has associated herewith a capacity detector according to an embodiment.

In some implementations, a capacity detector can be used with a coin sensor to compute the available capacity of a coin receptacle. In some embodiments, as shown in FIG. 2, the capacity detector can comprise a coin receptacle itself comprising a coin tube 2 configured to store a coin stack 4, an acoustic sensor itself comprising a microphone 10, and an acoustic signal generator 8. In some implementations, the coin stack 4 comprises a plurality of coins arranged in a face-to-face vertical stack, and rests on a base surface of the coin tube 2, the level of which is indicated by base datum line 6. In some implementations, the acoustic signal generator 8 and sensor 10 are disposed adjacent to the coin tube 2.

Figure 6:
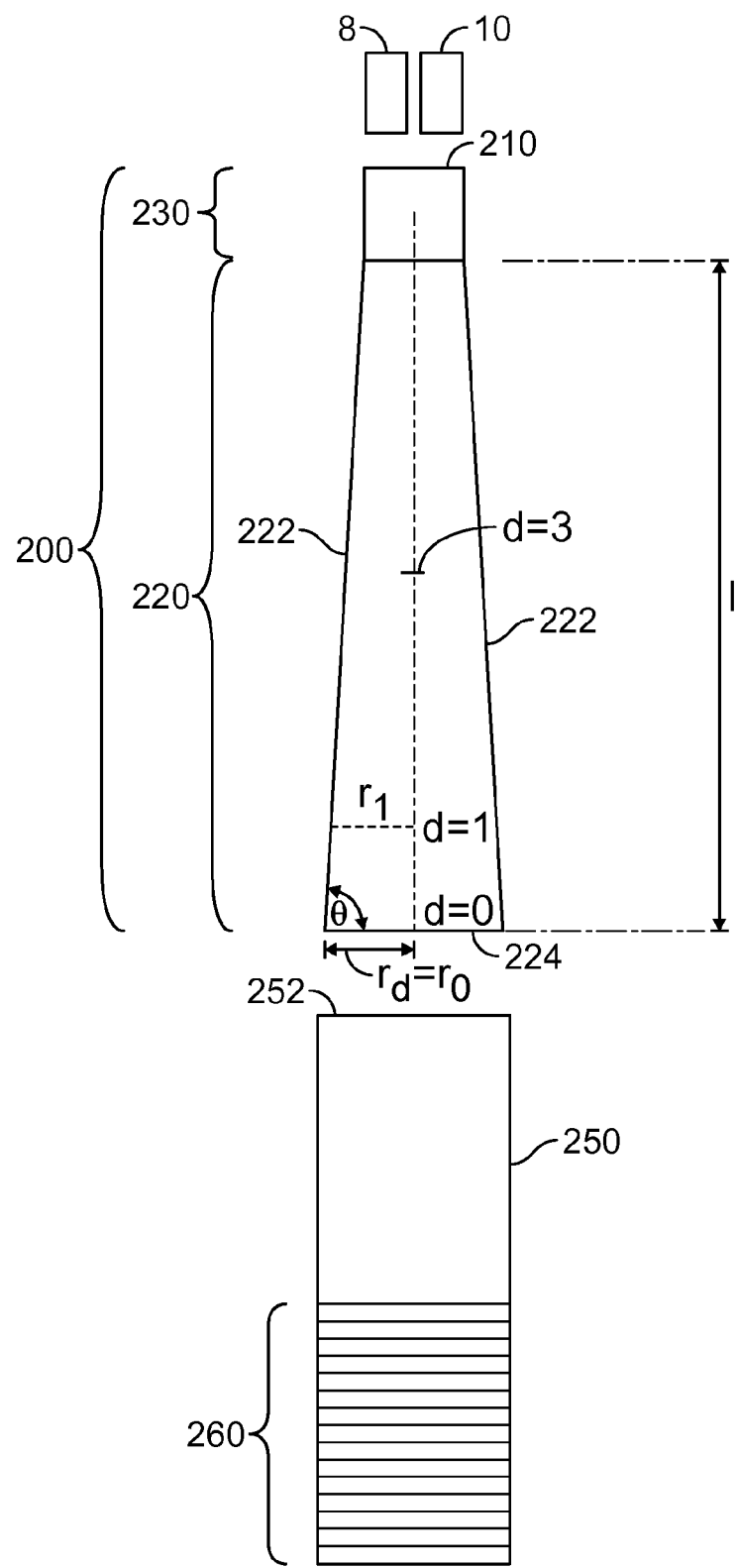
FIG. 6 is a sectional view of a waveguide comprising a tapered horn end according to an embodiment.

In some embodiments, as shown in FIG. 6, a waveguide 200 can be disposed in between at least one of a signal generator 8 or a sensor 10 and an inlet 252 of a coin receptacle 250. In one aspect, the waveguide 200 can be used with a coin sensor to guide the acoustic signal from the acoustic signal generator 8 to the coin receptacle 250.

It should be appreciated that reflections of the generated acoustic signal that are internal to the waveguide can interfere with accurately determining the available capacity of the coin receptacle. For example, as will be discussed in greater detail throughout the forthcoming sections, the available capacity of the receptacle can be computed by determining a time delay $t_d$ between the acoustic signal generated by the acoustic signal generator and the receipt of the return signal generated in response to a reflection of the acoustic signal by at least one surface within the coin receptacle. Internal waveguide reflections can be picked up by the same sensor that is used to sense the receipt of the return signal, and can therefore be troublesome where, for example, the separation in time between the generation of an acoustic signal and the receipt of a return signal is small.

In some implementations, the waveguide can be configured to minimize internal reflections due to acoustic impedance mismatches between the waveguide and free air, enhance the signal to noise ratio of the measurement signals, determine the distance of at least one surface within the coin receptacle that is disposed in close proximity to the acoustic sensor, or any combination thereof.

In some embodiments, the waveguide 200 can comprise an excitation end 210 for receiving an acoustic signal, a horn end 220 for disposition adjacent to a coin receptacle 250, and a conduit 230 interconnecting the horn and excitation ends 210 and 220 respectively. Horn end 220 itself can comprise an inner surface 222 bounding the acoustic signal transmission path.

In the embodiment shown in FIG. 6, the horn end defines a tapered horn configuration having a taper angle θ. In this configuration, the horn end 220 comprises a mouth end 224 having a radius $r_0$. The radius $r_d$ at any particular displacement d along the length l of horn end 220 with respect to the mouth end 224 can be computed according to the following equation:

$$r_d = r_0 - \frac{d}{\tan\theta} \quad \text{(Equation 1)}$$

Figure 7:
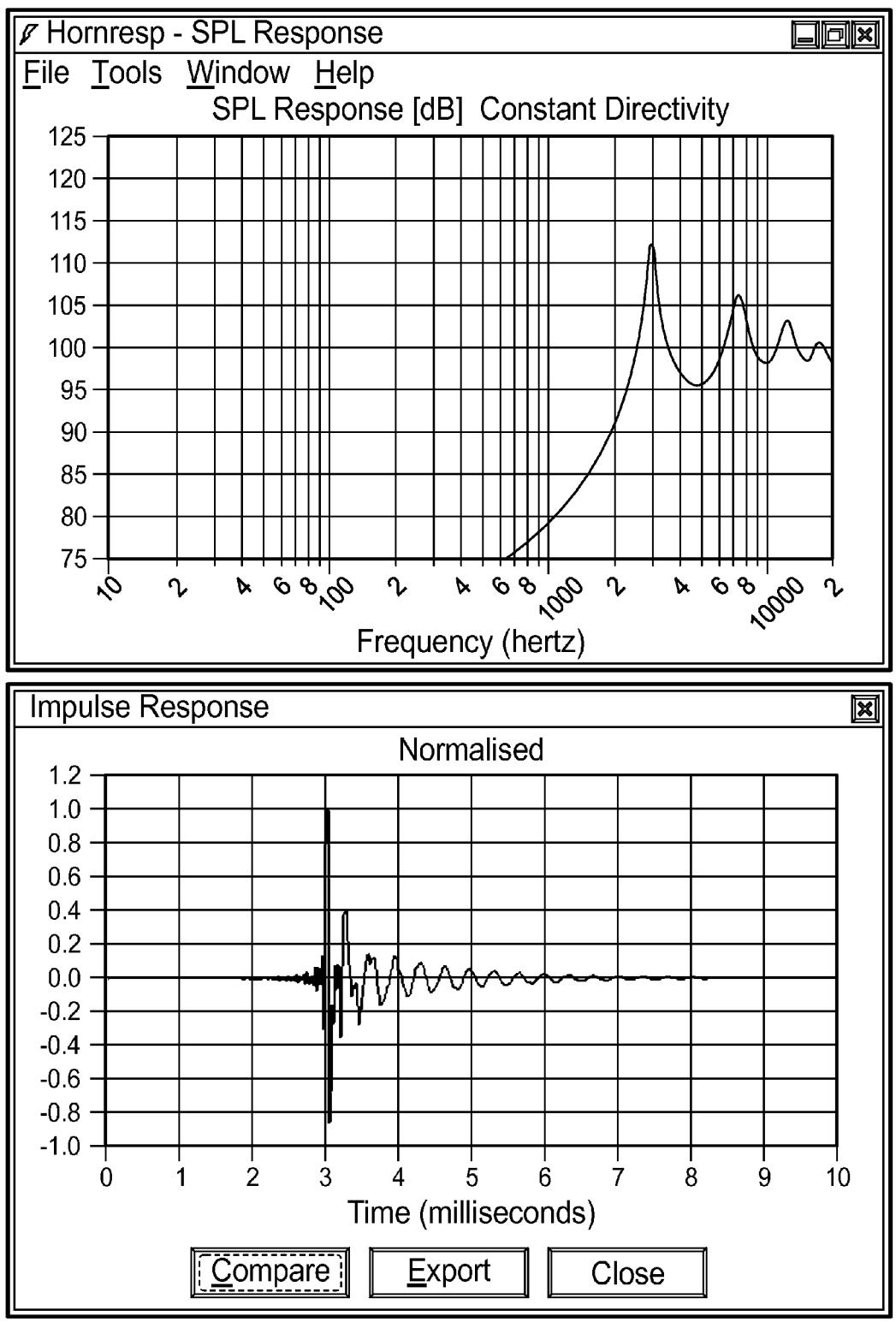
FIG. 7 illustrates the sound pressure level and impulse response of the waveguide of FIG. 6.

In one aspect, the gradual increase in the tapered horn end radius can reduce the instantaneous change in acoustic impedance presented to the acoustic signal as it traverses the interface between the horn end 220 mouth 222 and the coin receptacle 250 inlet 252. For example, referring to FIG. 7, it is shown that the impulse response of such a tapered horn end can be optimized to exhibit minimal reflections during the interval of 5-10 ms by adjusting the length l, mouth radius $r_0$, taper angle θ, and throat radius.

Figure 8:
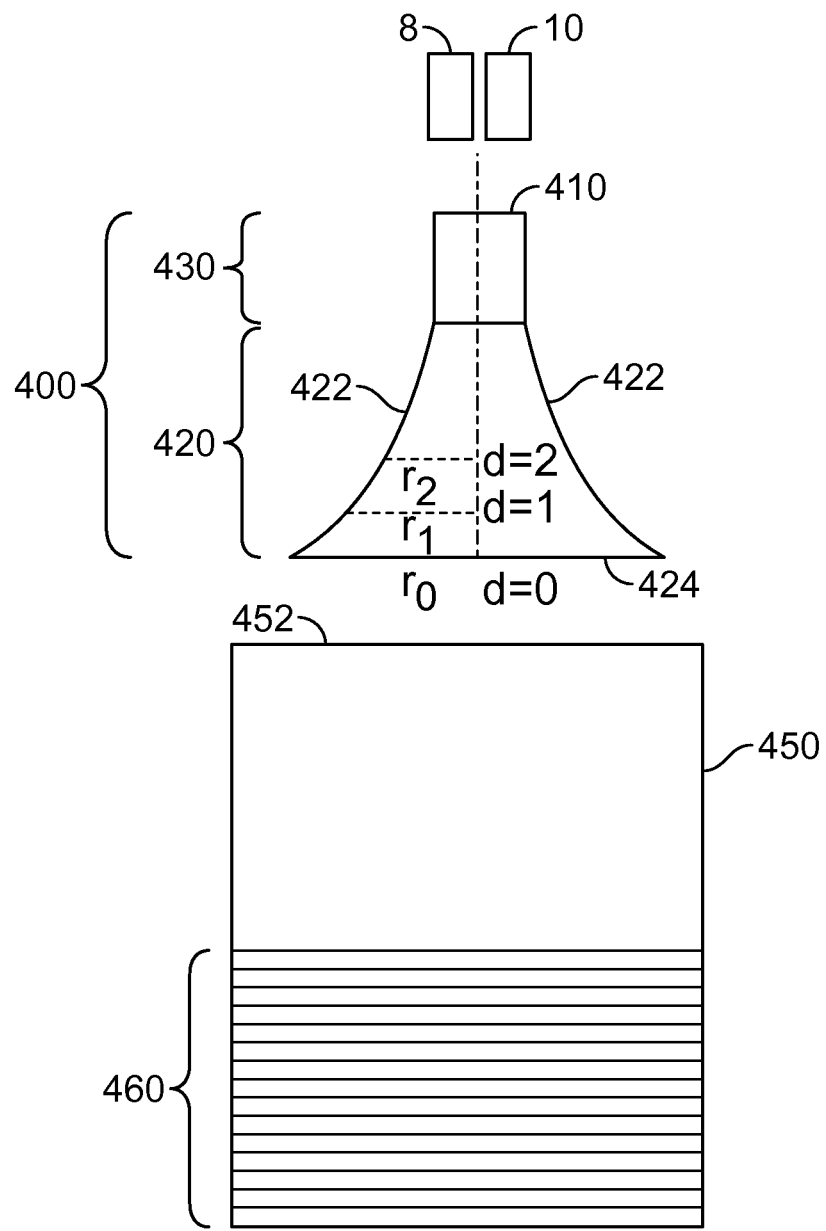
FIG. 8 is a sectional view of a waveguide comprising a tractrix horn end according to an embodiment.

In some embodiments, the horn end can define a tractrix horn configuration. For example, as shown in FIG. 8, a waveguide 400 comprising an excitation end 410 for receiving an acoustic signal, a horn end 420 for disposition adjacent to a coin receptacle 450, and a conduit 430 interconnecting the horn and excitation ends 410 and 420 respectively is illustrated, wherein the horn end 420 defines a tractrix horn end having an inner surface 422 bounding the acoustic signal transmission path.

In this configuration, the horn end 420 comprises a mouth end 424 having a radius $r_0$. The horn end 420 radius $r_d$ at any particular displacement d with respect to the mouth end 424 can be computed according to the following equation.

$$d = r_0 \times \ln\left(\frac{r_0 + \sqrt{r_0^2 - r_d^2}}{r_d}\right) - \sqrt{r_0^2 - r_d^2} \quad \text{(Equation 2)}$$

Figure 9:
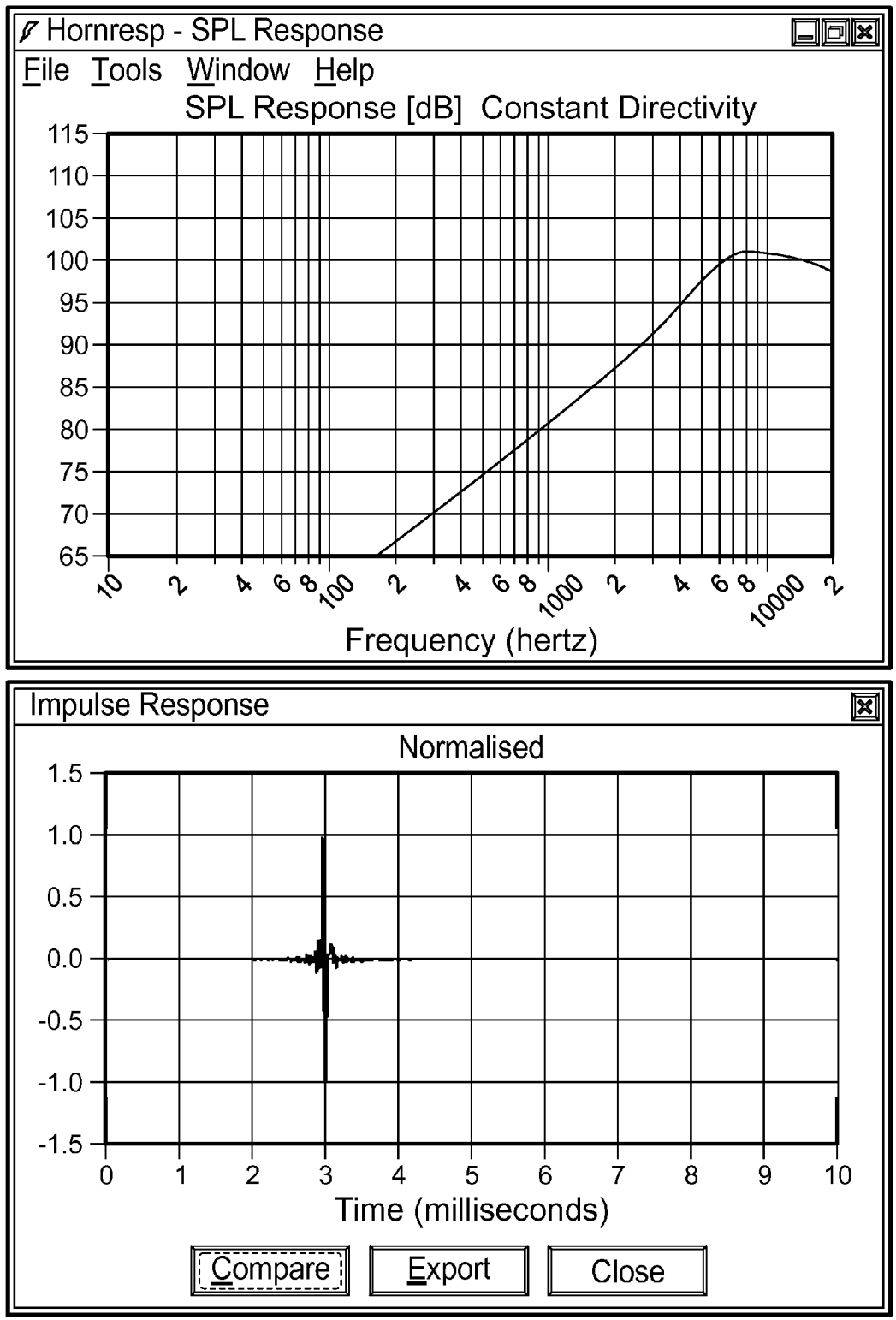
FIG. 9 illustrates the sound pressure level and impulse response of the waveguide of FIG. 8.

Referring to FIG. 9, it is shown that the impulse response of such a tractrix horn end can be optimized to exhibit minimal reflections during the interval of 3.25-10 ms by adjusting a length l, mouth radius $r_0$, and a throat radius.

Thus, it should be appreciated that such a configuration can provide for more accurate computation of the available capacity of the coin receptacle, and enables a more compact design. More specifically, by reducing the duration in which internal reflections can cause interference, return signals having shorter time delays can be measured more accurately measured, thus permitting the at least one surface within the coin receptacle to be disposed in closer proximity to the horn end.

It should be noted that other horn configurations can be used without departing from the scope of the present disclosure. In some embodiments, the horn ends discussed in the preceding sections can be approximated and/or optimized for performance, manufacturing capability, manufacturing cost, size, or any combination thereof. One skilled in the art will appreciate that such approximations and/or optimizations can be carried out using brute force methods, through simulation, iteratively, by hand, or any combination thereof.

Figure 10:
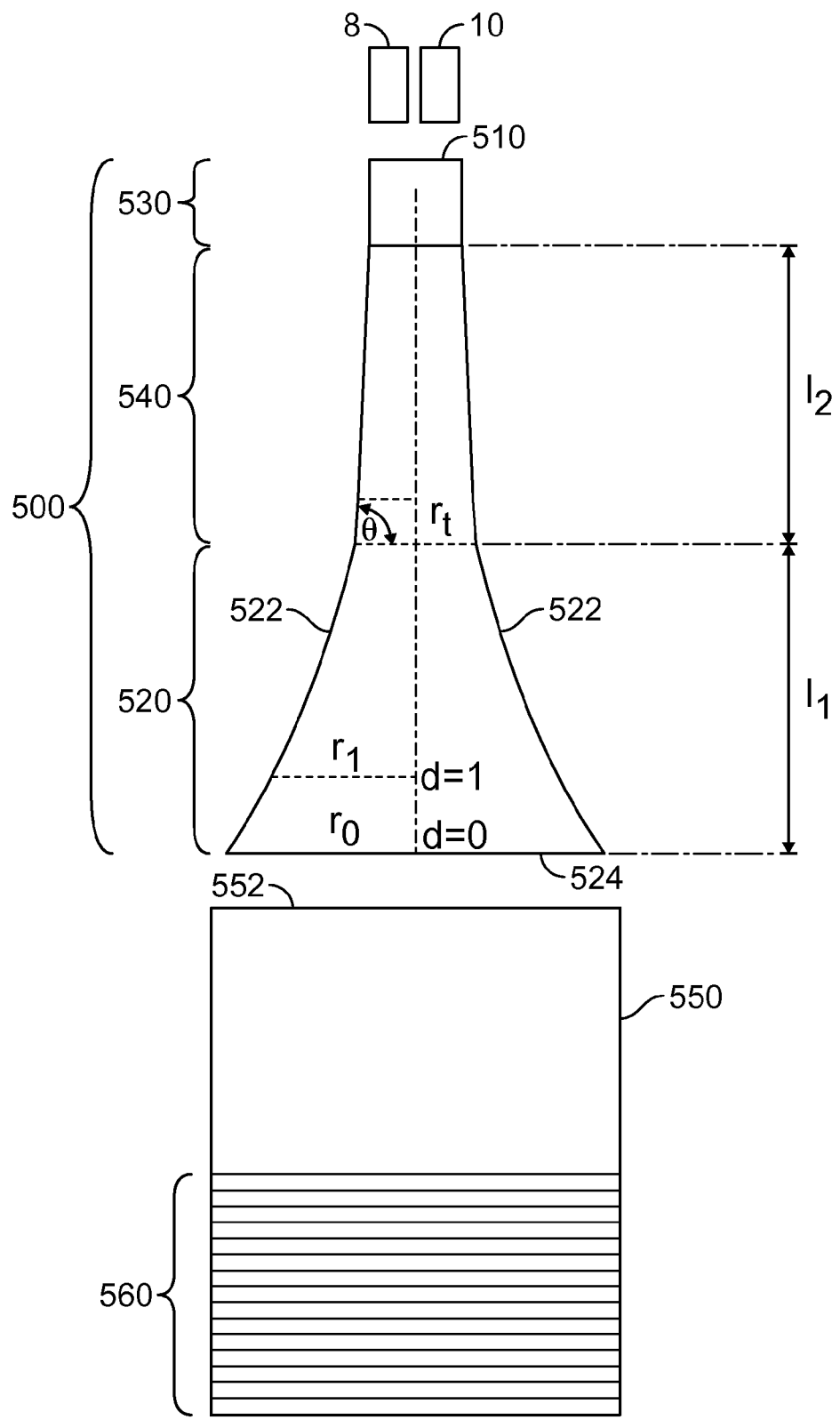
FIG. 10 is a sectional view of a waveguide comprising a modified tractrix horn end according to an embodiment.
Figure 11:
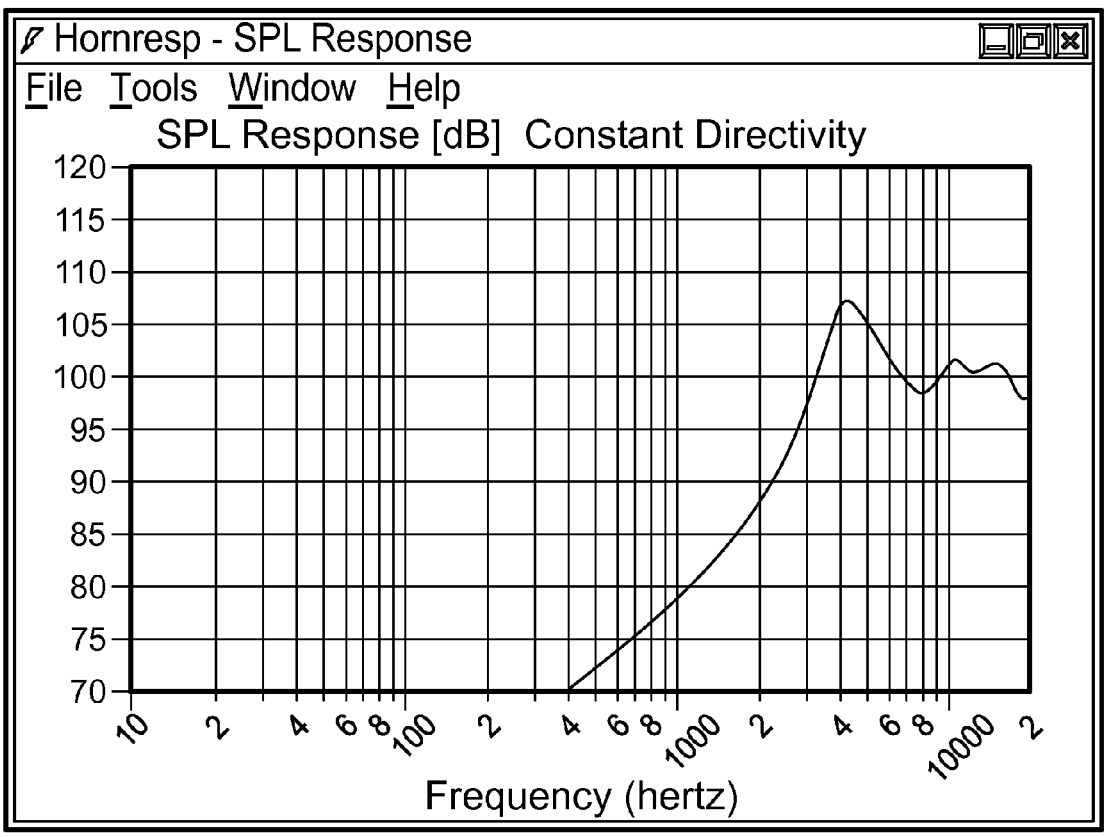
FIG. 11 illustrates the sound pressure level and impulse response of the waveguide of FIG. 10.
Figure 11:
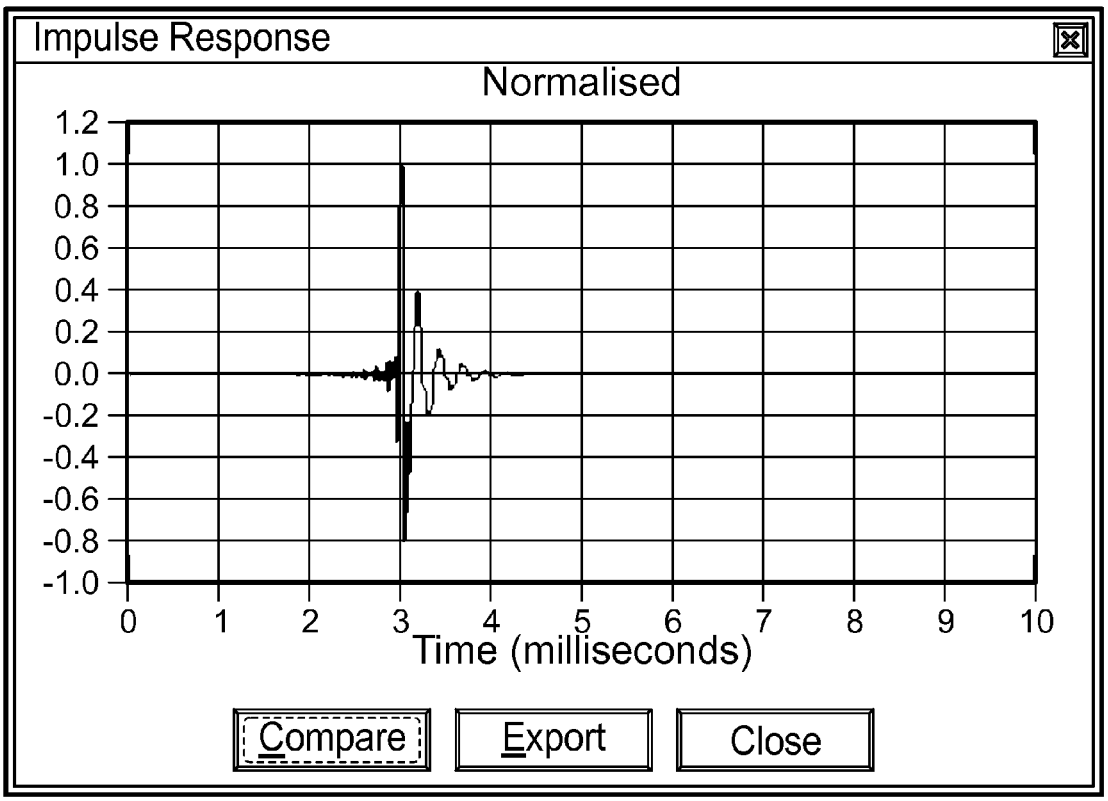

For example, in some embodiments, as shown in FIG. 10, a waveguide 500 can comprise an excitation end 510, a tapered horn 540, and a conduit 530 for interconnecting the excitation end 510 to the tapered horn 540, wherein the tapered horn is interconnected with a tractrix horn end 520. The tractrix horn end 520 comprises a mouth end 524 having a radius $r_0$. As shown in FIG. 11, the impulse response of such a waveguide comprising a modified tractrix horn end can be optimized to exhibit minimal reflections during the interval of 4-10 ms by adjusting a length $l_1$, length $l_2$, tractrix mouth radius $r_0$, taper mouth radius $r_t$, taper angle θ, and a throat radius.

Figure 12:
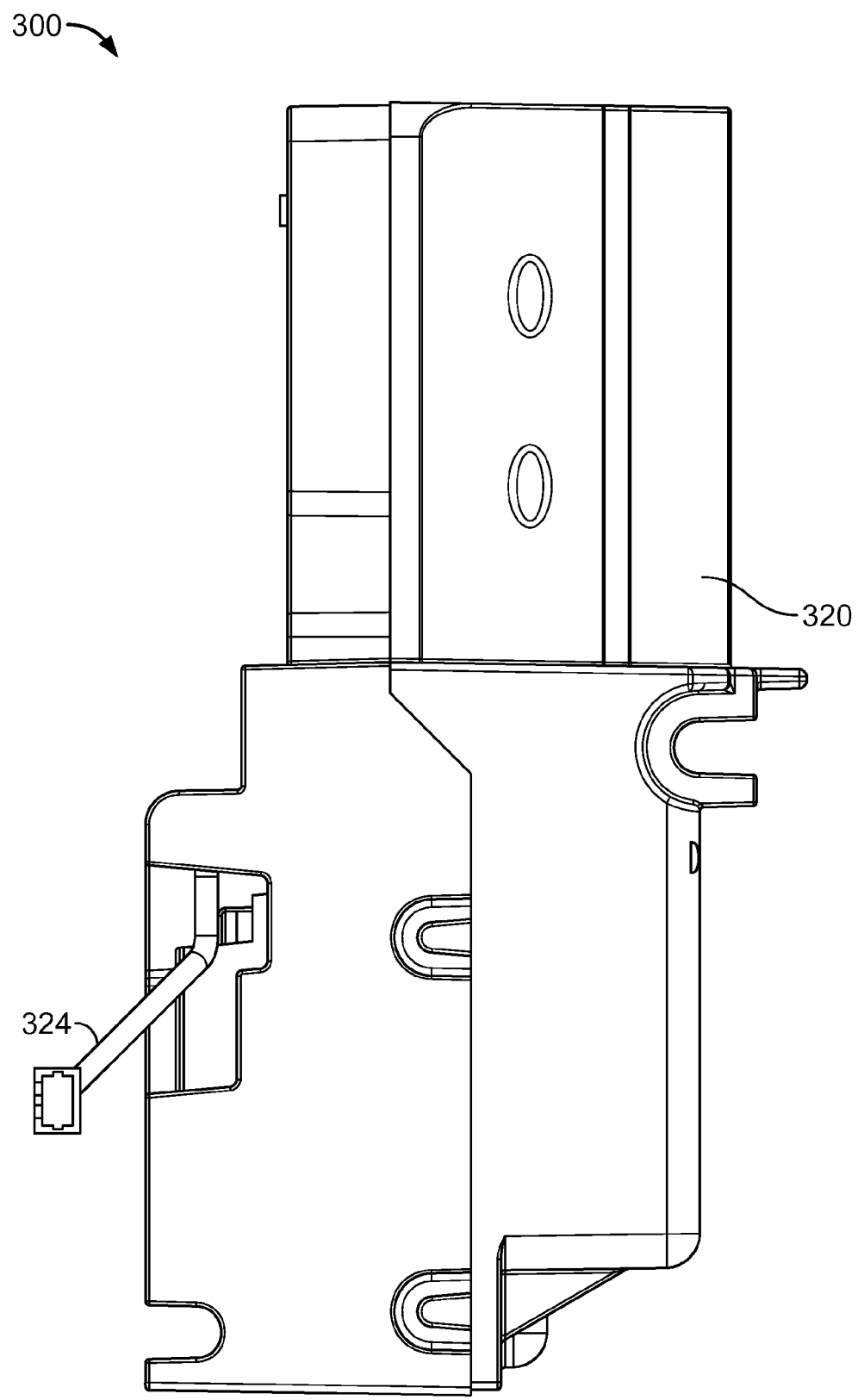
FIG. 12 is a plan view of a modified-tractrix acoustic module according to an embodiment.
Figure 13:
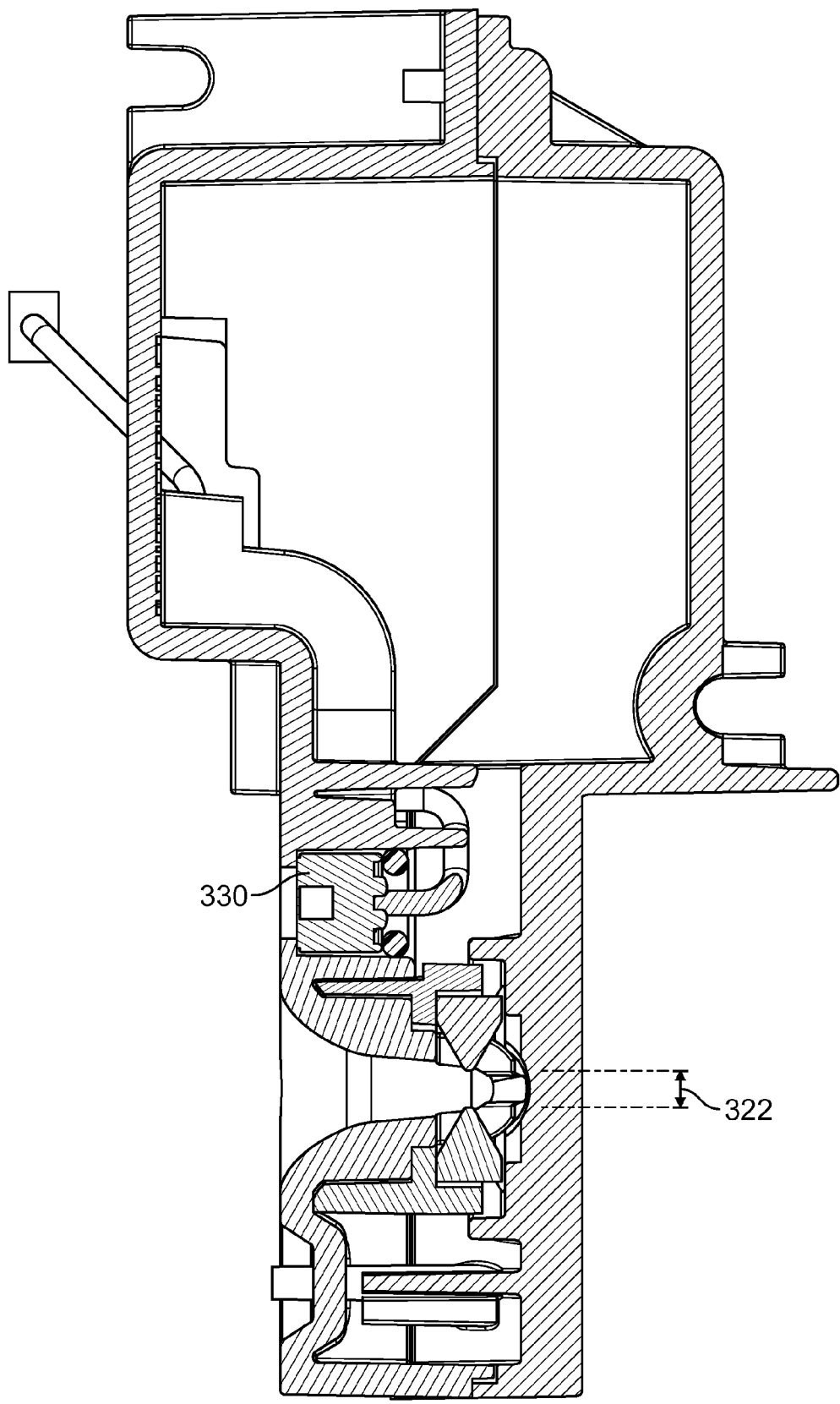
FIG. 13 is a sectional view of the modified-tractrix acoustic module of FIG. 12.
Figure 14:
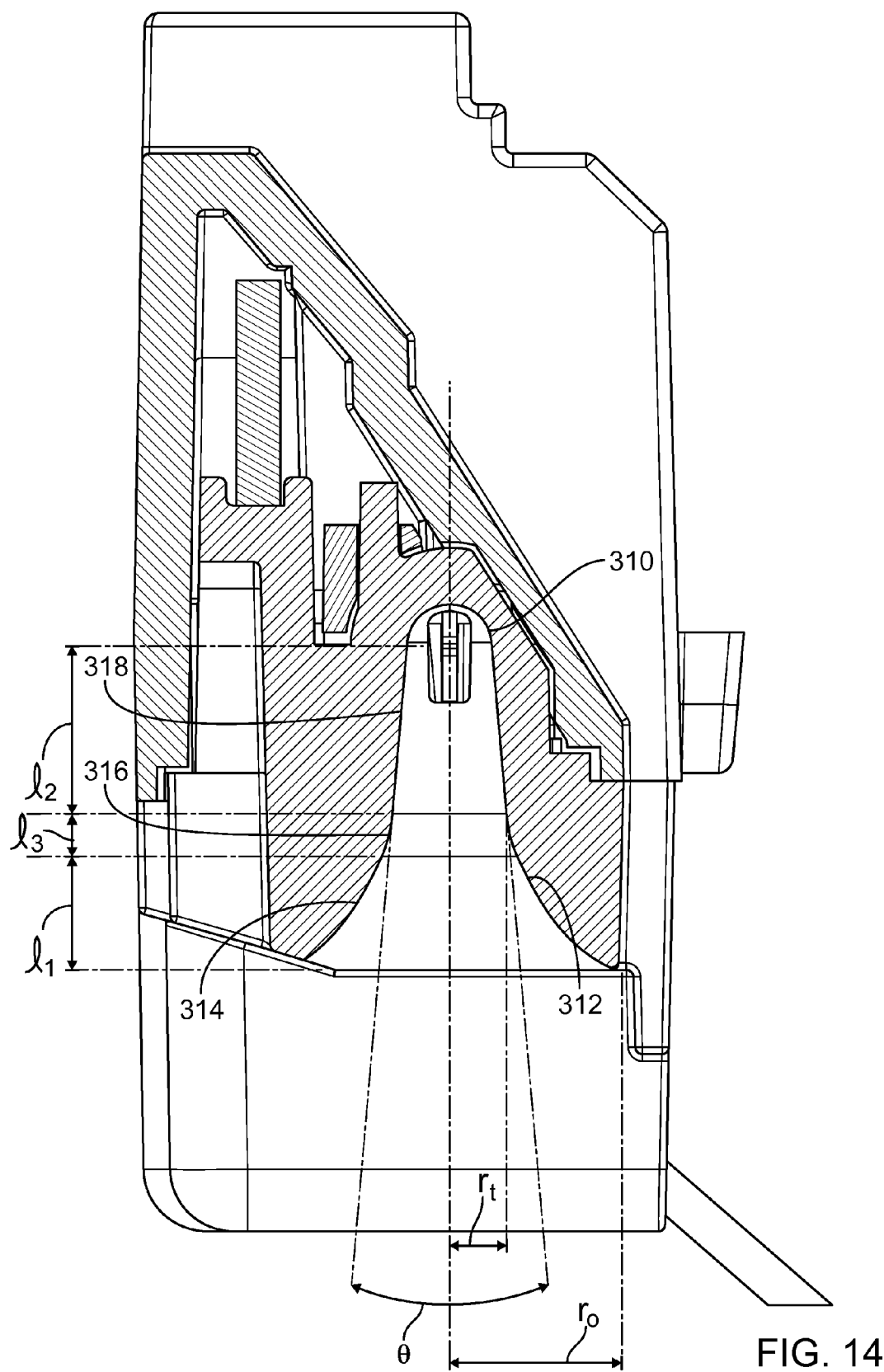
FIG. 14 is a sectional view of the modified-tractrix acoustic module of FIG. 12.

In some implementations, an acoustic module for use with a coin sensor can comprise a waveguide terminated with a horn end, an acoustic sensor, and an acoustic generator. For example, as shown in FIGS. 12-14, an acoustic module 300 comprises a waveguide 310, itself terminated with a horn 312. The horn 312 itself comprises a tractrix section 314, a transition section 316, and a tapered section 318. The acoustic module also includes an acoustic signal generator 320, itself comprising a spark gap 322. The spark gap 322 is configured to be energized by an external voltage source through cable 324. In a further aspect, the acoustic module 300 also includes an acoustic sensor 330, such as a microphone, disposed adjacent to the mouth of the horn 312.

Figure 15:
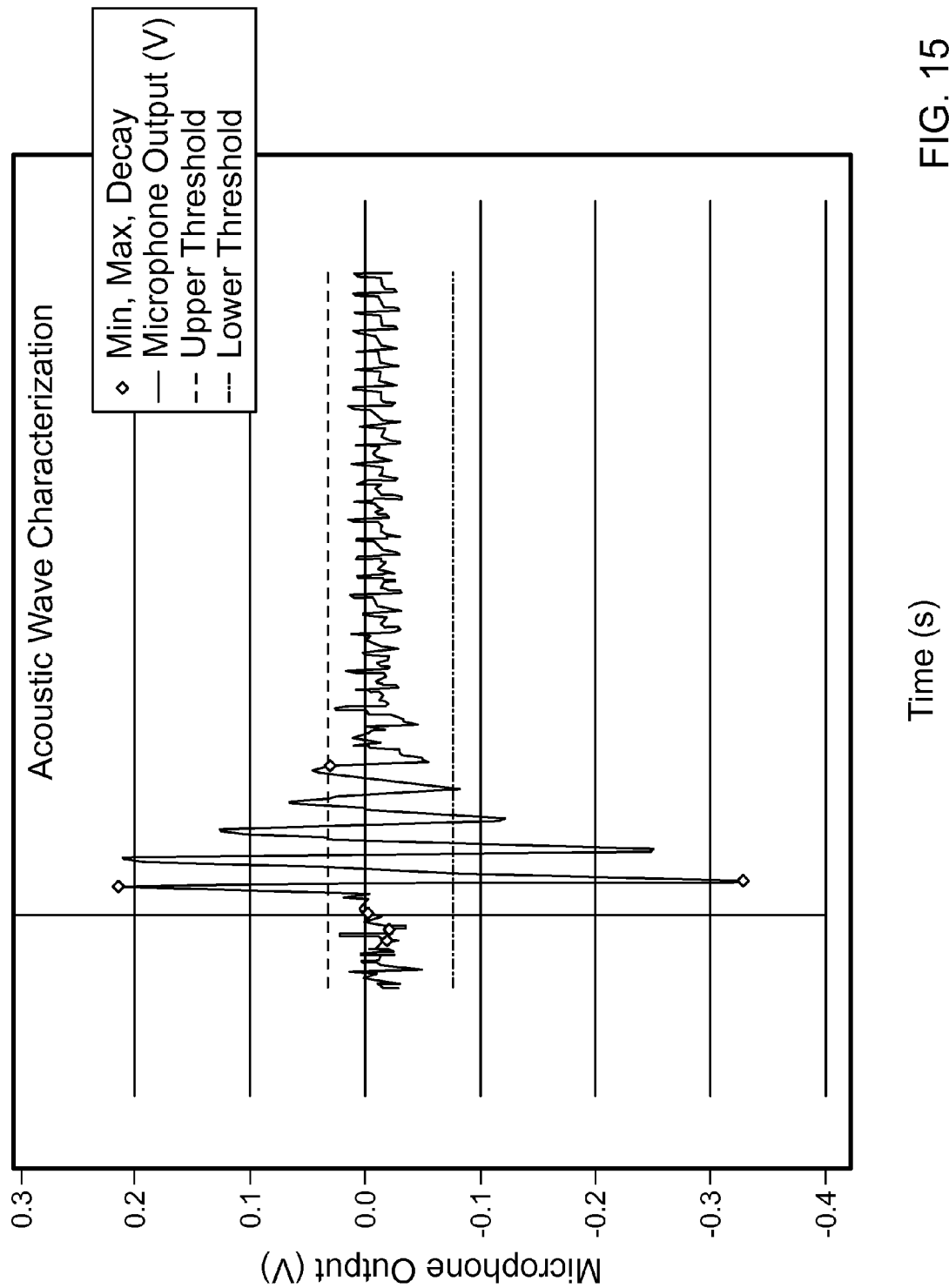
FIG. 15 is the impulse response of the acoustic module of FIG. 12.

As shown in FIG. 14-15, the impulse response of such a waveguide comprising a modified-tractrix horn end having a length $l_1=4.02$ mm, length $l_2=5.96$ mm, length $l_3=1.52$ mm, tractrix mouth radius $r_0$, taper mouth radius $r_t=1.495$ mm, taper angle $\theta=10°$, spark height=11.50 mm, and total height=13 mm is demonstrated to exhibit minimal reflections during the interval of 100 µs-100 µs.

However, it should be noted that while the aforementioned modified-tractrix parameters can provide suitable performance, other parameters can be used without departing from the spirit and scope of the present disclosure. In some implementations, the length $l_1$ can range between 100 µm-100 mm. For example, the length $l_1$ can be equal to but is not limited to the following values: 100 µm, 500, 750 µm, 1.00 mm, 2.00 mm, 3.00 mm, 4.00 mm, 5.00 mm, 6.00 mm, 7.00 mm, 8.00 mm, 9.00 mm, 10.00 mm, 20.00 mm, 30.00 mm, 40.00 mm, 50.00 mm, 60.00 mm, 70.00 mm, 80.00 mm, 90.00 mm, 100 mm.

In some implementations, length $l_2$ can range between 100 µm-100 mm. For example, the length $l_2$ can be equal to but is not limited to the following values: 100 µm, 500, 750 µm, 1.00 mm, 2.00 mm, 3.00 mm, 4.00 mm, 5.00 mm, 6.00 mm, 7.00 mm, 8.00 mm, 9.00 mm, 10.00 mm, 20.00 mm, 30.00 mm, 40.00 mm, 50.00 mm, 60.00 mm, 70.00 mm, 80.00 mm, 90.00 mm, 100 mm.

In some implementations, length $l_3$ can range between 100 µm-100 mm. For example, the length $l_3$ can be equal to but is not limited to the following values: 100 µm, 500, 750 µm, 1.00 mm, 2.00 mm, 3.00 mm, 4.00 mm, 5.00 mm, 6.00 mm, 7.00 mm, 8.00 mm, 9.00 mm, 10.00 mm, 20.00 mm, 30.00 mm, 40.00 mm, 50.00 mm, 60.00 mm, 70.00 mm, 80.00 mm, 90.00 mm, 100 mm.

In some implementations, tractrix mouth radius $r_0$ can range between 100 µm-100 mm. For example, the tractrix mouth radius $r_0$ can be equal to but is not limited to the following values: 100 µm, 500, 750 µm, 1.00 mm, 2.00 mm, 3.00 mm, 4.00 mm, 5.00 mm, 6.00 mm, 7.00 mm, 8.00 mm, 9.00 mm, 10.00 mm, 20.00 mm, 30.00 mm, 40.00 mm, 50.00 mm, 60.00 mm, 70.00 mm, 80.00 mm, 90.00 mm, 100 mm.

In some implementations, taper mouth radius $r_t$, can be in the range of 100 µm-100 mm. For example, the taper mouth radius $r_t$, can be equal to, but is not limited to the following values: 100 µm, 500, 750 µm, 1.00 mm, 2.00 mm, 3.00 mm, 4.00 mm, 5.00 mm, 6.00 mm, 7.00 mm, 8.00 mm, 9.00 mm, 10.00 mm, 20.00 mm, 30.00 mm, 40.00 mm, 50.00 mm, 60.00 mm, 70.00 mm, 80.00 mm, 90.00 mm, 100 mm.

In some implementations, taper angle $\theta$, can be in the range of 0.1°-89.9°. For example, the, taper angle $\theta$, can be equal to, but is not limited to the following values: 0.1°, 0.2°, 0.5°, 1.0°, 2.0°, 1.0°, 2.0°, 5.0°, 10.0°, 20.0°, 50.0°, 89.9°.

In some implementations, spark height can be in the range of 100 µm-100 mm. For example, the spark height, can be equal to, but is not limited to the following values: 100 µm, 500, 750 µm, 1.00 mm, 2.00 mm, 3.00 mm, 4.00 mm, 5.00 mm, 6.00 mm, 7.00 mm, 8.00 mm, 9.00 mm, 10.00 mm, 20.00 mm, 30.00 mm, 40.00 mm, 50.00 mm, 60.00 mm, 70.00 mm, 80.00 mm, 90.00 mm, 100 mm.

In some implementations, the total height can be in the range of 100 µm-100 mm. For example, the total height, can be equal to, but is not limited to the following values: 100 µm, 500, 750 µm, 1.00 mm, 2.00 mm, 3.00 mm, 4.00 mm, 5.00 mm, 6.00 mm, 7.00 mm, 8.00 mm, 9.00 mm, 10.00 mm, 20.00 mm, 30.00 mm, 40.00 mm, 50.00 mm, 60.00 mm, 70.00 mm, 80.00 mm, 90.00 mm, 100 mm.

In some embodiments employing a modified tratrix horn, an empty coin tube has a long range of about 176.96 mm measured from microphone to base of the tube and a shortest range of about 9.46 mm measured from the top of the tube. In contrast, a tapered horn has a longest range of 178.30 mm for an empty tube, and a shortest range of 14.41 mm. In both instances, although it is possible, in some instances, to fill a tube beyond this point, the acoustics are not designed to be accurate above this level.

Figure 16:
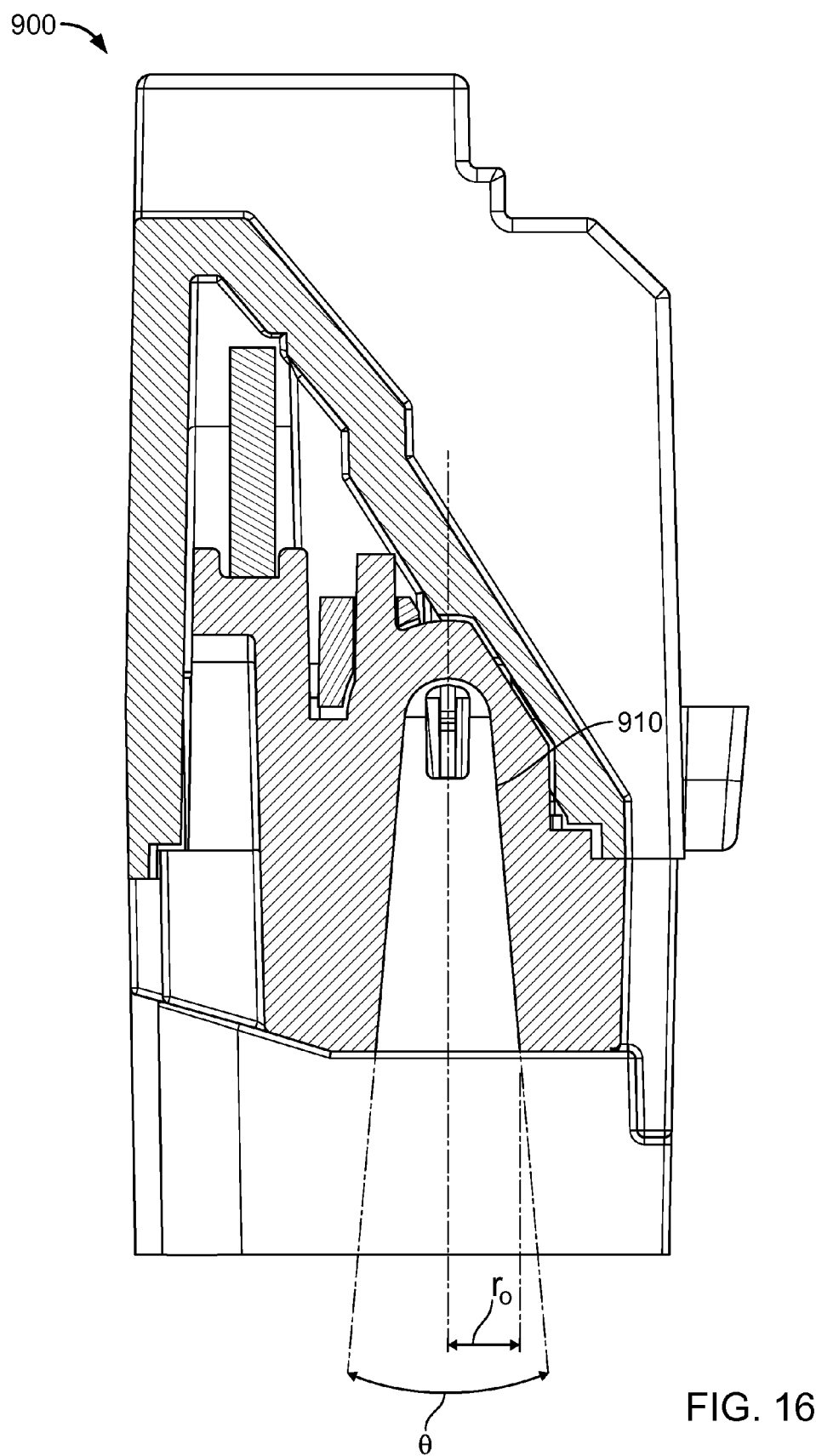
FIG. 16 is a tapered acoustic module according to an embodiment.

In some implementations, as shown in FIG. 16, an acoustic module 900 can comprise a waveguide 910 terminated with a tapered horn having a taper angle $\theta=7.4°$ and mouth radius $r_0=3$ mm. Referring also to FIG. 14, it should be noted that the tapered horn length $l=11.69$ mm is greater than the overall length of the modified tractrix horn, wherein the length $l=11.50$ mm. Referring to Table 1 below, it is demonstrated that the modified-tractrix configuration of FIG. 14 provides superior minimization of unwanted signal reflection. More specifically, it is demonstrated that a modified-tractrix terminated waveguide exhibits a 165% increase in impulse amplitude and a 18% reduction in reflection decay time. It should thus be appreciated that the horn designs disclosed herein enable a more compact design.

TABLE 1

| | Modified-tractrix | | | Tapered | | |
|---|---|---|---|---|---|---|
| Test Run # | Pk-Pk Amplitude of Acoustic Signal (V) | Decay time (s) | Pulse factor (=Amplitude/ Decay time) | Pk-Pk Amplitude of Acoustic Signal (V) | Decay time (s) | Pulse factor (=Amplitude/ Decay time) |
| 1 | 5.96E−01 | 4.16E−04 | 1.43E+03 | 2.21E−01 | 4.22E−04 | 5.24E+02 |
| 2 | 5.72E−01 | 4.18E−04 | 1.37E+03 | 2.09E−01 | 4.54E−04 | 4.59E+02 |
| 3 | 6.22E−01 | 3.36E−04 | 1.85E+03 | 1.89E−01 | 6.60E−04 | 2.86E+02 |
| 4 | 5.40E−01 | 3.16E−04 | 1.71E+03 | 2.22E−01 | 4.14E−04 | 5.36E+02 |
| 5 | 6.06E−01 | 3.38E−04 | 1.79E+03 | 1.87E−01 | 4.36E−04 | 4.29E+02 |
| 6 | 5.51E−01 | 4.22E−04 | 1.31E+03 | 2.08E−01 | 4.26E−04 | 4.88E+02 |
| 7 | 5.46E−01 | 3.16E−04 | 1.73E+03 | 2.46E−01 | 4.24E−04 | 5.80E+02 |
| 8 | 4.96E−01 | 3.14E−04 | 1.58E+03 | 2.14E−01 | 4.24E−04 | 5.06E+02 |
| 9 | 5.65E−01 | 4.32E−04 | 1.31E+03 | 2.27E−01 | 4.26E−04 | 5.32E+02 |

TABLE 1-continued

|  | Modified-tractrix | | | Tapered | | |
| --- | --- | --- | --- | --- | --- | --- |
| Test Run # | Pk-Pk Amplitude of Acoustic Signal (V) | Decay time (s) | Pulse factor (=Amplitude/ Decay time) | Pk-Pk Amplitude of Acoustic Signal (V) | Decay time (s) | Pulse factor (=Amplitude/ Decay time) |
| 10 | 6.98E−01 | 3.14E−04 | 2.22E+03 | 2.33E−01 | 4.24E−04 | 5.49E+02 |
| 11 | 5.81E−01 | 4.32E−04 | 1.35E+03 | 2.24E−01 | 4.22E−04 | 5.31E+02 |
| 12 | 6.14E−01 | 3.32E−04 | 1.85E+03 | 1.81E−01 | 4.38E−04 | 4.13E+02 |
| 13 | 6.16E−01 | 3.36E−04 | 1.83E+03 | 2.09E−01 | 4.52E−04 | 4.61E+02 |
| 14 | 6.53E−01 | 3.14E−04 | 2.08E+03 | 2.27E−01 | 4.36E−04 | 5.21E+02 |
| 15 | 6.31E−01 | 3.36E−04 | 1.88E+03 | 2.15E−01 | 4.26E−04 | 5.06E+02 |
| 16 | 5.90E−01 | 4.18E−04 | 1.41E+03 | 2.25E−01 | 4.20E−04 | 5.35E+02 |
| 17 | 5.10E−01 | 3.34E−04 | 1.53E+03 | 2.10E−01 | 4.26E−04 | 4.92E+02 |
| 18 | 5.92E−01 | 3.90E−04 | 1.52E+03 | 1.97E−01 | 4.26E−04 | 4.63E+02 |
| 19 | 5.34E−01 | 3.14E−04 | 1.70E+03 | 2.14E−01 | 4.28E−04 | 5.01E+02 |
| 20 | 5.43E−01 | 4.22E−04 | 1.29E+03 | 2.29E−01 | 4.22E−04 | 5.43E+02 |
| 21 | 6.30E−01 | 3.34E−04 | 1.89E+03 | 2.14E−01 | 4.52E−04 | 4.74E+02 |
| 22 | 5.04E−01 | 4.32E−04 | 1.17E+03 | 1.99E−01 | 5.38E−04 | 3.70E+02 |
| 23 | 5.58E−01 | 3.86E−04 | 1.45E+03 | 2.14E−01 | 4.28E−04 | 4.99E+02 |
| 24 | 5.97E−01 | 4.24E−04 | 1.41E+03 | 1.96E−01 | 4.54E−04 | 4.32E+02 |
| 25 | 5.89E−01 | 3.38E−04 | 1.74E+03 | 2.33E−01 | 4.24E−04 | 5.50E+02 |
| 26 | 5.44E−01 | 3.14E−04 | 1.73E+03 | 2.03E−01 | 8.28E−04 | 2.45E+02 |
| 27 | 4.92E−01 | 4.34E−04 | 1.13E+03 | 2.14E−01 | 4.24E−04 | 5.04E+02 |
| 28 | 4.37E−01 | 4.30E−04 | 1.02E+03 | 2.28E−01 | 4.24E−04 | 5.38E+02 |
| 29 | 5.47E−01 | 3.36E−04 | 1.63E+03 | 2.14E−01 | 4.24E−04 | 5.04E+02 |
| 30 | 4.73E−01 | 4.16E−04 | 1.14E+03 | 1.92E−01 | 4.32E−04 | 4.44E+02 |
| 31 | 5.44E−01 | 3.38E−04 | 1.61E+03 | 2.02E−01 | 4.26E−04 | 4.75E+02 |
| 32 | 5.42E−01 | 3.40E−04 | 1.59E+03 | 2.35E−01 | 4.24E−04 | 5.54E+02 |
| Average | 5.66E−01 | 3.68E−04 | 1.57E+03 | 2.13E−01 | 4.53E−04 | 4.83E+02 |

In some implementations, a manifold for use with a coin sensor can comprise a plurality of waveguides, each waveguide itself comprising a excitation end, a horn end, and a conduit for interconnecting the excitation and horn ends. For example, referring to FIG. 17, a manifold 60 comprises a plurality of waveguides 70, 72, 74, 76, and 78. Each of the waveguides 70, 72, 74, 76, and 78 comprises a conduit 80, 82, 84, 86, and 88 respectively for interconnecting each horn end 66, and excitation end 80. In some implementations, the manifold can comprise a plurality of acoustic sensor clips 68 adjacent to each horn end 66 for attachment of an acoustic sensor adjacent to each coin receptacle 128, 130, 131, 132, and 134. However, it should be noted that the manifold 60 can be configured for attachment of acoustic sensors in other ways without departing from the scope of the present disclosure.

In some embodiments, the manifold 60 can comprise an acoustic chamber 90 for receiving and distribution of an acoustic signal generated by an acoustic signal generator 8 to each waveguide 70, 72, 74, 76, and 78. In some aspects, the chamber 90 can comprise a pair of wires separated by a short distance (e.g. 3 mm), wherein the wires are configured to be interconnected with a spark generator. In some implementations, the manifold can comprise a single acoustic sensor clip (not shown) disposed adjacent to the chamber 90. In this design, a common acoustic sensor can be used to sense the return signal of each coin receptacle.

In some embodiments, any one of the plurality horn ends can be defined by tractrix, exponential, tapered, modified-tractrix, modified exponential, modified tapered, or any combination thereof. In one aspect, each waveguides 70, 72, 74, 76, and 78 can be configured to have a horn end 66 disposed adjacent to coin receptacles 128, 130, 131, 132, and 134 respectively.

Figure 17:
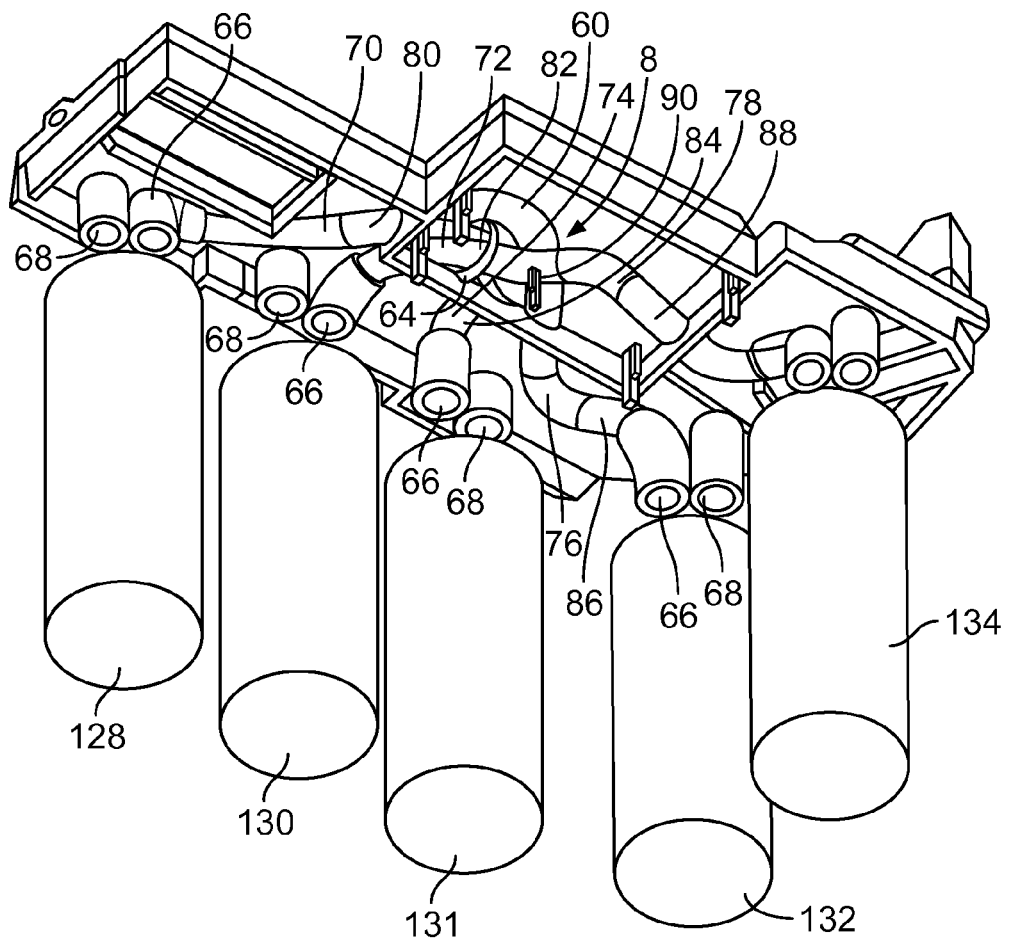
FIG. 17 is a perspective view of a coin storage section of the apparatus of FIG. 1 according to an embodiment.
Figure 17:
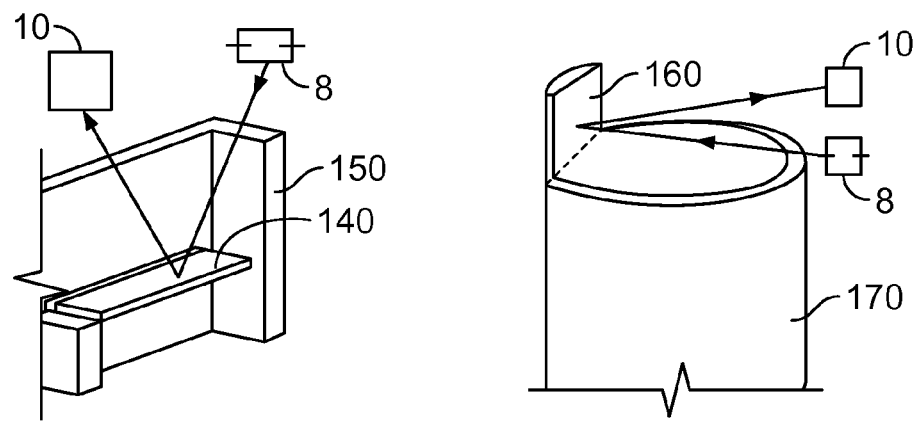

While each of the coin receptacles 128, 130, 131, 132, and 134 geometries shown in FIG. 17 is illustrated to be identical to one another, it should be understood that any one or more of the coin receptacles can have a different geometry associated with a particular coin denomination. It should also be noted that one or more of the waveguides, excitation ends, horn ends, or any combination thereof can be individually optimized with respect to the associated coin receptacle, coin denomination, location relative to the acoustic chamber, or any combination thereof.

It should be noted that while the waveguides 70, 72, 74, 76, and 78 appear to be permanently attached to the manifold 60, in some implementations, one or more of the waveguides can be can be configured to be detachable from the manifold. In some embodiments, a waveguide, manifold, or any combination thereof can be configured for retrofit of any additional waveguide. For example, such a configuration can be especially useful in situations where it is desired to add an additional coin receptacle without replacing the entire manifold.

Figure 20:
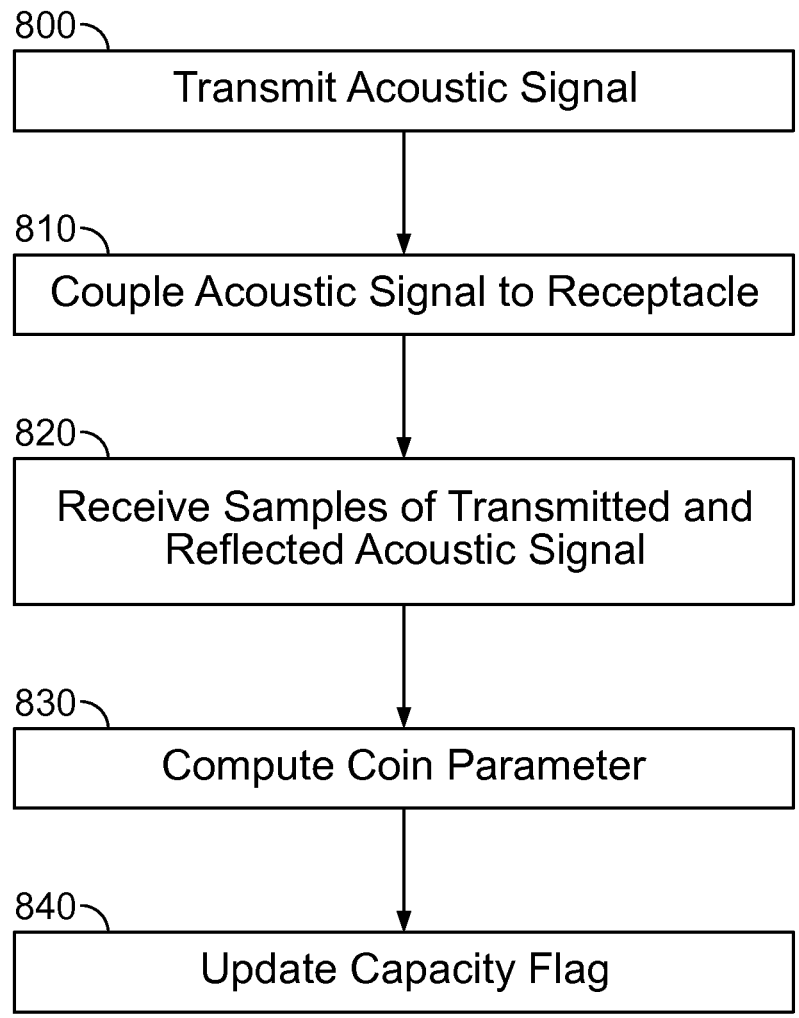
FIG. 20 is a flowchart illustrating the steps of measuring the capacity of a receptacle according to an embodiment.

In some embodiments, methods of sensing a capacity of a coin receptacle are disclosed herein. In one aspect, referring to FIG. 20, an acoustic signal is transmitted in Step 800. Such an acoustic signal can be generated by an acoustic signal generator as discussed in the preceding sections. For example, the acoustic signal can be generated by a spark, acoustic impulse, or any combination thereof.

In Step 810, the acoustic signal is coupled to a coin receptacle wherein the coin receptacle is itself configured to store a coin stack comprising at least one coin. In some implementations, the acoustic signal can be coupled to the coin receptacle through a waveguide. The waveguide itself can comprise an excitation end for receiving an acoustic signal, a horn end for disposition adjacent to a coin receptacle, and a conduit interconnecting the horn end and the excitation end. In some embodiments, the horn end defines a horn selected from a tapered horn, an exponential horn, a tractrix horn, or a modified tractrix horn.

In some implementations the horn end radius expands gradually to reduce the instantaneous change in acoustic impedance presented to the acoustic signal as it traverses through and exits the waveguide. For example, the horn end can be configured to minimize internal reflection of the acoustic signal within the waveguide.

In one aspect, as shown in Step 820, samples of the acoustic signal and a return signal are received, wherein the return signal is generated in response to at least one surface within the coin receptacle reflecting the transmitted acoustic signal. In some implementations, samples of the acoustic signal and the return signal can be received by an acoustic sensor which outputs measurement signals representative of the received acoustic and return signals to a processor.

As shown in Step 830, at least one parameter of the coin receptacle is computed based upon a time delay between receiving the transmitted and returned signals. For example, in some implementations, the height of the stack, available capacity of the coin receptacle, a distance between the at least one surface of the stack and the acoustic sensor, or any combination thereof can be computed by the processor. In one aspect, the at least one surface can comprise a surface of the uppermost coin in the stack.

As discussed in the preceding sections, a processor can be configured to compute the height $H_S$ of a coin stack based upon the time delay $t_d$ between the generation of an acoustic signal and the receipt of a return signal generated in response to a reflection by at least one surface within a coin receptacle. In some implementations, as shown in FIG. 2, both the acoustic signal generator 8 and the acoustic sensor 10 can be located on a sensor datum line 12, which is itself located at a height H above the base datum line 6 of the coin receptacle (although it would be possible for the generator 8 and the sensor 12 to be mounted at different heights).

It should be appreciated that a return signal will therefore be generated in response to at least one surface within the coin tube 2 reflecting the acoustic signal generated by acoustic signal generator 8. For example, a return signal is generated in response to a reflection of the acoustic signal by a surface of the uppermost coin in the stack 4.

However, it should be noted that the return signal can be generated in response to a reflection of the acoustic signal by the coin tube 2 itself. For example, when the coin tube 2 is empty, a return signal is generated in response to reflection of the acoustic signal by the coin tube 2 base.

In one aspect, the acoustic sensor 10 outputs measurement signals in response to receiving samples of transmitted or reflected acoustic signals. In some implementations, a processor (not shown) can be configured to compute at least one parameter of the coin tube 2 in response to receiving the measurement signals. In some aspects, the processor can be configured to compute the height of the stack 4, the available capacity of the coin tube 2, the distance between a surface of the uppermost coin in the stack 4 and the acoustic sensor 10, or any combination thereof.

In some implementations, the processor can be configured to compute a time delay $t_d$ between the acoustic signal generation and the receipt of the return signal. The processor can also be configured to compute the height $H_S$ of the stack 4, stored within a coin tube 2 having a height $H_R$, wherein the coin tube 2 inlet is disposed a distance $D_{IS}$ from the acoustic sensor 10 according to the following equation.

$$H_S = H_R + D_{IS} - \frac{V \times t_d}{2} \qquad \text{(Equation 3)}$$

It should be noted that as expressed in Equation 3, $t_d$ is the time delay between the generation of an acoustic signal and the receipt of the return signal by a generator 8 and a sensor 10 that are equidistantly disposed a distance $D_{IS}$ with respect to the coin tube 2. To the extent that the generator 8 and sensor 10 are respectively disposed non-equidistant distances $D_G$ and $D_S$ with respect to the coin tube 2 inlet, the processor can be configured to compute the stack height $H_S$ according to the following equation.

$$H_S = H_R + \frac{D_S + D_G - V \times t_d}{2} \qquad \text{(Equation 4)}$$

The speed of sound, V, in either Equation 3 or 4 can be computed according to the following equation.

$$V = \left(331.29 \times \sqrt{\frac{T}{273}}\right) \text{m/s} \qquad \text{(Equation 5)}$$

It should be appreciated that the speed of sound V is dependent on the absolute temperature. In some embodiments, an average absolute temperature can be used to compute the speed of sound. However, it should be noted that in some implementations, the actual absolute temperature can be used to compute the speed of sound.

Figure 4:
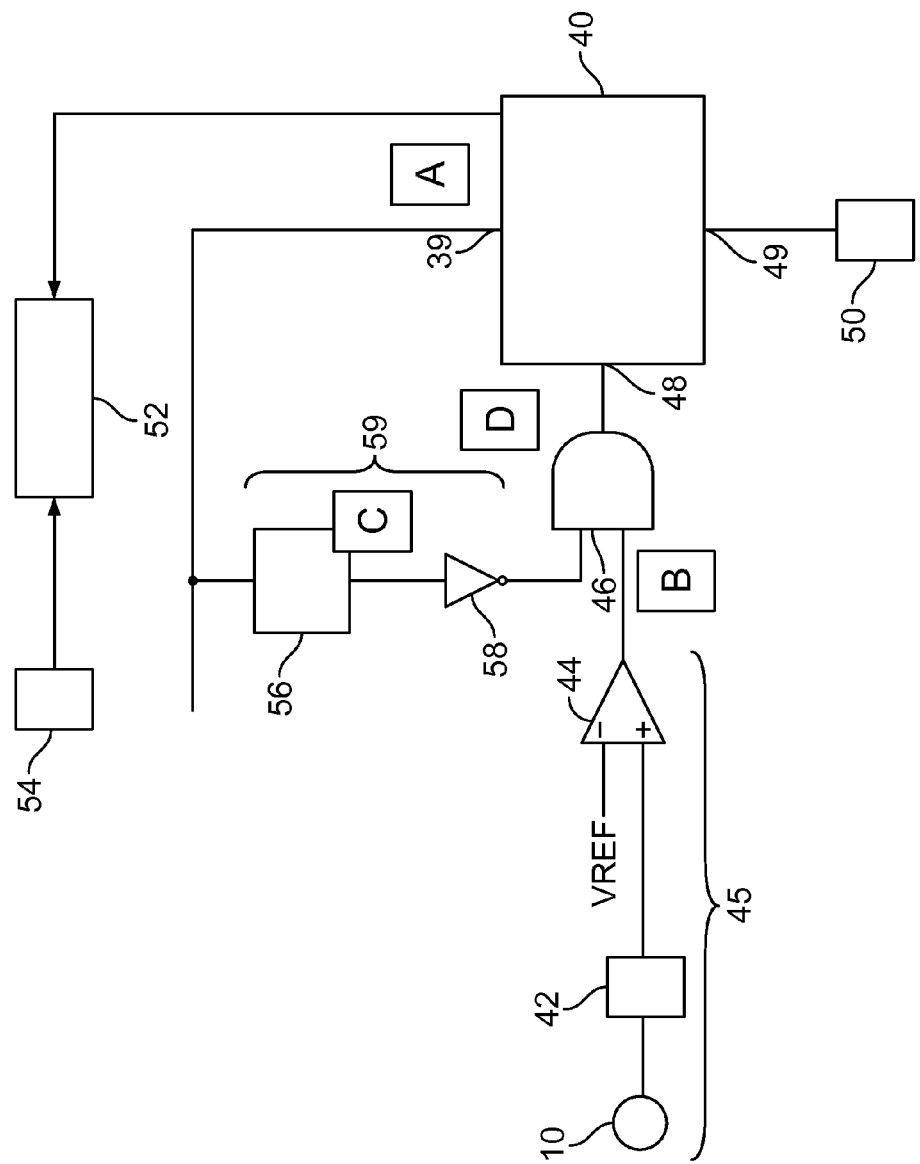
FIG. 4 is a diagram of a circuit for operating a capacity detector according to an embodiment.

For example, referring to FIG. 4, in some implementations, the currency handling apparatus can include a processor 52, which is coupled to a temperature sensor 54 which itself is configured to output measurement signals in response to sensing the actual absolute temperature. In some implementations, the processor 52 can be configured to compute the speed of sound V based upon the actual temperature measurement signals output by the temperature sensor 54.

In some embodiments, the stack height can be computed accurately without requiring a temperature measurement. For example, referring to FIG. 17, an acoustically reflective surface 140 can be affixed at a predetermined distance D relative to the acoustic signal generator 8 and sensor 10. The processor can be configured to compute the actual speed of sound based upon the predetermined distance D and the time delay between generating and receiving the return signal generated in response to a reflection by the affixed reflective surface 140. The computed actual speed of sound can be used by the processor in subsequent computations of the coin stack height, available capacity of the coin receptacle, distance between the uppermost coin in the stack and the acoustic sensor, or any combination thereof.

Referring back to FIG. 2, in some implementations, the manufacturing tolerance of the dimension $H_R+D_{IS}$ can be controlled and therefore approximated as a constant during operation. However, it should be noted that the dimension $H_R+D_{IS}$ can also be computed on-the-fly during operation vis-à-vis an initial calibration operation. For example, in some implementations, the processor can be configured to perform an initial calibration test to ascertain the actual time delay $t_d$ when the coin tube 2 is empty, and thereafter compute the dimension $H_R+D_{IS}$ according to the following equation.

$$H_R + D_{IS} = \frac{V \times t_d}{2} \qquad \text{(Equation 6)}$$

In some embodiments, a control circuit can be configured to cause the triggering of an acoustic signal, such as but not limited to a spark, by the acoustic signal generator 8. For example, in some embodiments, the acoustic signal generator 8 can comprise a spark gap which is configured to generate a spark in response to input from the control circuit.

Figure 3:
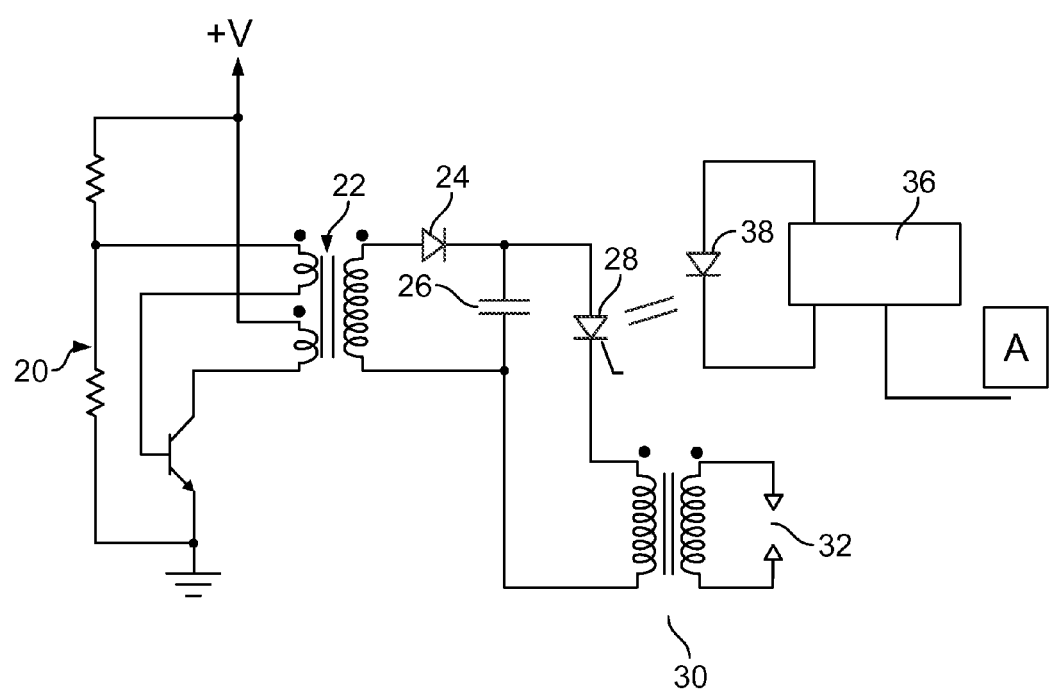
FIG. 3 is a diagram of a circuit for operating a capacity detector according to an embodiment.

In some implementations, as shown in FIG. 3, the acoustic signal generator 8 can comprise power electronics circuitry for generating a spark across a spark gap. In some implementations, an oscillator 20 is coupled to an inverter transformer 22. The output of the transformer 22 is rectified by a diode 24, and the DC output of approximately 250 VDC is stored in the capacitor. This DC voltage is coupled via a thyristor 28 across a step-up transformer 30. Upon triggering of the thyristor 28, a voltage of approximately 9 kV is generated at the output of step up transformer 30, thereby generating a powerful spark having a rise time of less than 20 µs across the spark gap 32. Advantageously, the power of the spark can be coupled directly to the air rather than to the surrounding structure, thus resulting in a very efficient and brief acoustic impulse.

In some implementations, a switch such as a thyristor 28 can be triggered at regular intervals (e.g. 50 Hz) by a spark rate generator 36, which itself comprises a light emitting diode 38 for optical coupling of the trigger signal to the thyristor 28. In one aspect, the spark rate generator 36 can include an output node A, which is configured to output a pulse signal each time a spark is triggered. It should be noted that other types of switches can be used without departing from the spirit and scope of the present disclosure.

As discussed in the preceding sections, a processor can be configured to compute a time delay $t_d$ between generation of an acoustic signal and the receipt of a return signal. In some implementations, the processor can be configured to compute such a time delay by multiplying a counter value which is indicative of the time delay $t_d$ by the periodicity of the counter clock (e.g. 20 ns). For example, referring to both FIGS. 3 and 4, an acoustic sensor comprises a counter 40, which is configured to measure the time delay $t_d$ between the acoustic signal and the return signal. In one aspect, the counter 40 includes start, stop, and clock inputs 39, 48, and 49 respectively. The clock input 49 is coupled to a clock generator 50. The start input 39 is coupled to the pulse signal which is output on terminal A, thereby triggering the start of the counter 40 each time a spark is triggered. The stop input 48 is coupled to the output of an AND gate 46, which itself receives inputs from a microphone circuit 45 and a blanking circuit 59, thereby triggering the stop of the counter 40 each time the microphone 10 receives a return signal.

It should thus be clear to those skilled in the art that the counter 40 counts the number of clock periods between the generation of an acoustic signal created by a spark, and sampling of the return signal by the microphone 10. The processor can therefore be configured to compute the time delay by multiplying a counter value which is indicative of the time delay $t_d$ by the periodicity of the counter clock.

In some implementations, the acoustic sensor circuit 45 can be configured to reject return signals having amplitudes outside of a predetermined range. For example, in some implementations, the acoustic sensor circuit 45 comprises a microphone 10 having an output which is coupled through an amplifier 42, and a comparator 44 to an AND gate 46 input. Thus, the acoustic sensor circuit 45 is configured to inhibit the output of the AND gate 46 unless the microphone 10 receives a sufficiently large input, and accordingly, outputs a sufficiently large measurement signal such as to cause the amplifier 42 output to exceed a predetermined threshold of $V_{REF}$, thereby causing the comparator to output a logic high signal.

The generation of a spark can cause initial pulses and/or vibrations which are picked up by the microphone 10. Such signals can interfere with the operation of the counter 40 by causing it to prematurely stop counting before the microphone 10 has received the return signal.

In some implementations, the acoustic sensor circuit 45 can comprise a blanking circuit 59 which is configured to prevent interference from a spark from prematurely stopping the counter 40. In one aspect, the blanking circuit 59 can comprise an inverter 58 interconnecting an input of the AND gate 46 to a delay circuit 56. The delay circuit 56 is itself coupled to the pulse signal output on terminal A, and is configured to output a blanking pulse for a predetermined duration in response to being triggered by a pulse signal output on terminal A. In one aspect, the predetermined blanking pulse duration (e.g. 150 µs) can be configured to overlap with the duration in which spark interference signals are expected to occur. The blanking pulse logic state is inverted by the inverter 58, thereby pulling an AND gate 46 input to a logic low and preventing interference signals picked up by the microphone 10 from prematurely stopping the counter 40.

Figure 5:
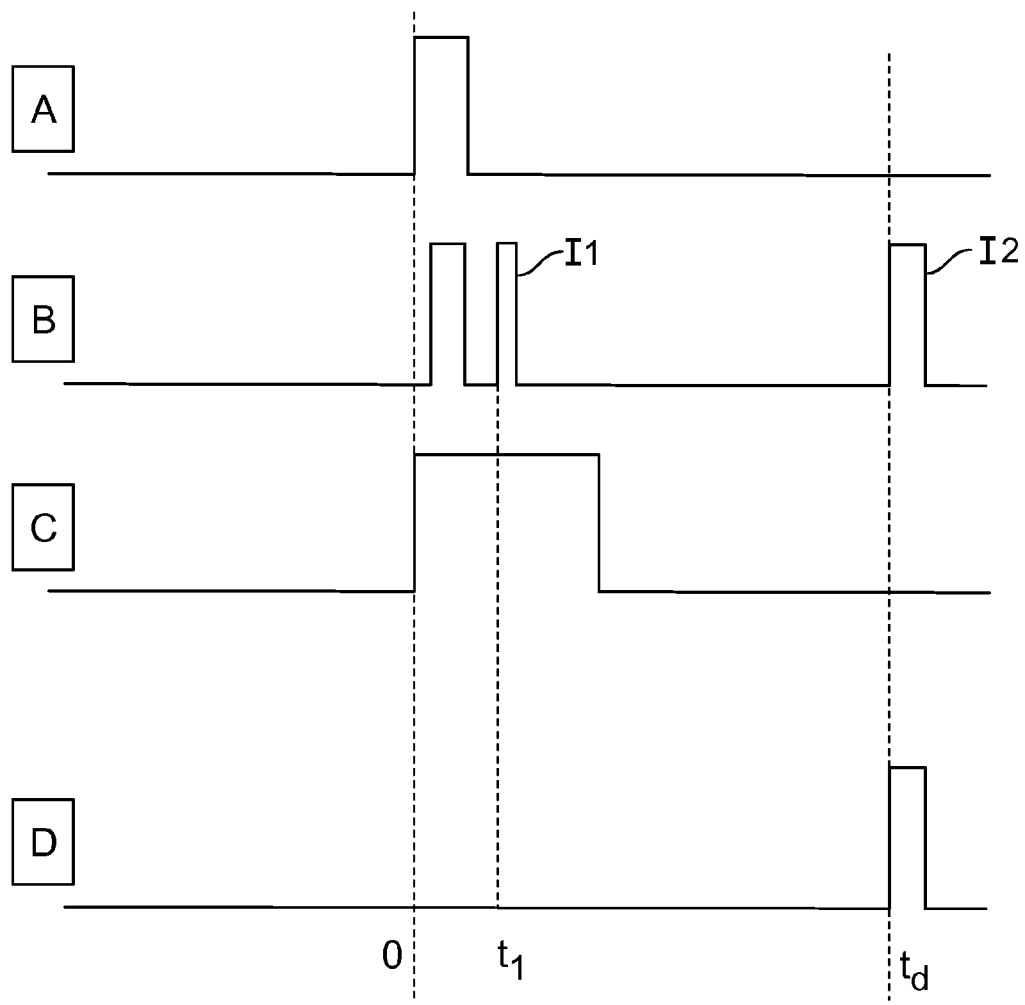
FIG. 5 is a diagram of waveforms appearing in the circuits of FIGS. 4-5.

By way of further illustration, the timing diagram of FIG. 5 illustrates the timing of the signals present at circuit nodes A, B, C, and D of FIG. 4, wherein the delay time is defined as $t_d$.

In some embodiments, a processor can be configured to compute at least one parameter of the coin receptacle in response to receiving measurement signals from the acoustic sensor. For example, as shown in FIG. 4, the processor 52 receives measurement signals comprising a delay time $t_d$ between the generation of an acoustic signal created by a spark, and sampling of the return signal. In some implementations, the spark rate generator 36 can be continuously activated at a desired rate throughout a period when measurements are being made. In some aspects, in order to improve resolution, the processor 52 can take and average a plurality of measurements from the counter 40.

However, it should be appreciated that the processor 52 can be configured to compute at least one parameter of the coin receptacle in response to receiving other types of measurement signals from the acoustic sensor. For example, referring back to FIG. 4, in one embodiment the microphone 10 can be coupled to an analog to digital converter (not shown), which can be configured to digitize the acoustic signals received by the microphone 10. The digitized acoustic signals can be stored in a memory device (not shown). The processor 52 can then be configured to access the memory device, and compute the time delay between the transmitted acoustic signal generated by spark based upon the digitized acoustic signals stored in the memory device.

As discussed in the preceding sections, the capacity detector disclosed herein can be used to detect the proximity between at least one surface within a coin receptacle and an acoustic sensor. However, it should be appreciated that the apparatus and methods disclosed herein can be applied to other objects other than coins (e.g. banknote store capacity, vending machine capacity, etc.) without departing from the spirit and scope of the present disclosure.

For example, in some embodiments, the apparatus and methods disclosed herein can also be applied to detect the available capacity of a receptacle configured to store modern banknotes, which themselves can include single or multi-layer metallic or conductive structures such as a foil.

Figure 18:
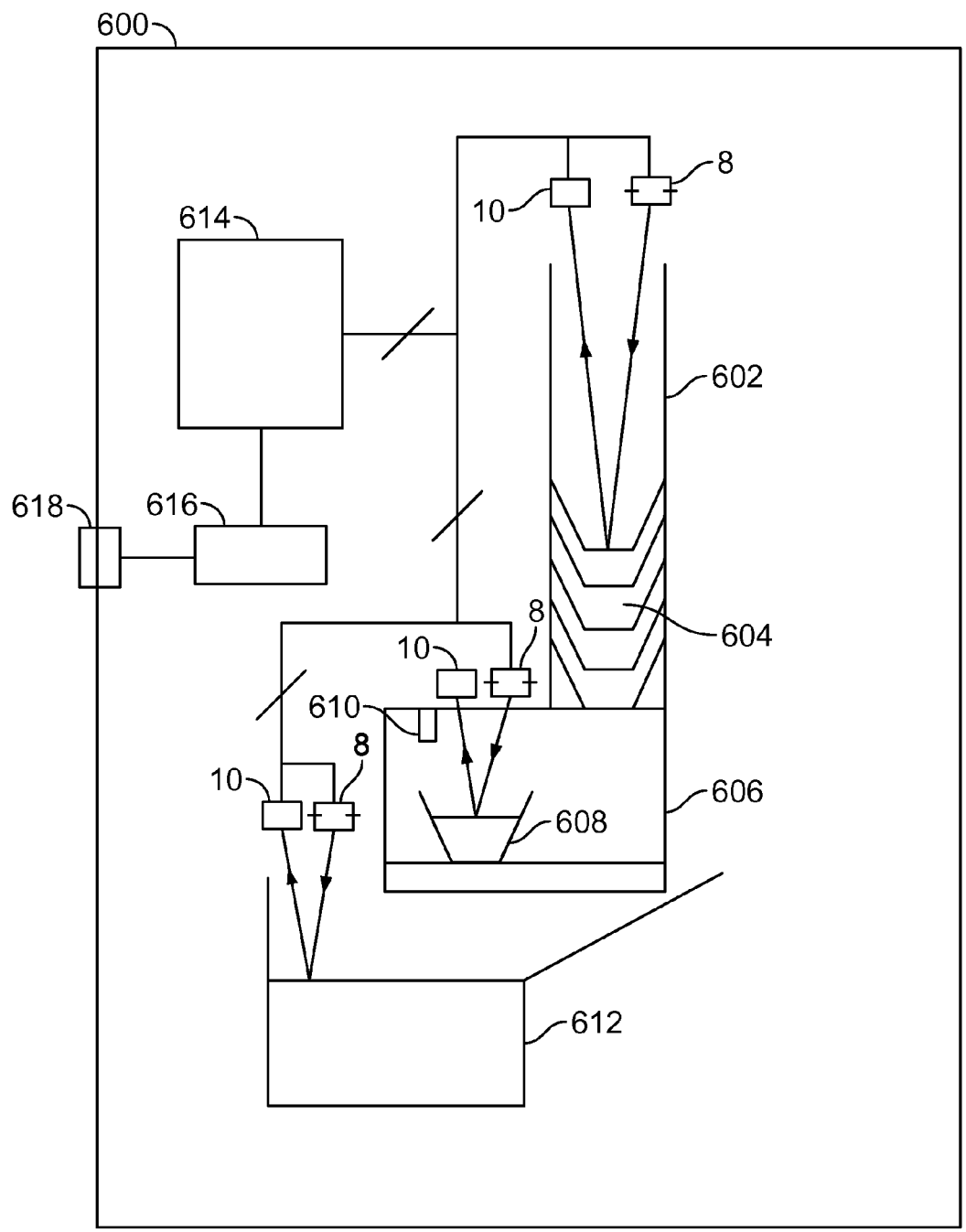
FIG. 18 illustrates schematic diagrams showing various configurations of a coin validator according to an embodiment.

In some implementations, the capacity detector can be used to detect the available storage capacity of a vending machine. In one implementation, as shown schematically in FIG. 18, a vending machine 600 is configured to dispense hot drinks. In one aspect, a cup store 602 stores cups in a stack 604, from which the bottommost cup can be delivered to a filling compartment 606, as indicated at 608. Hot water is then fed to the cup 608 via a spout 610. Any spilled liquid drains into an overspill container 612.

The machine comprises three acoustic signal generator/sensor pairs 8 and 10, each of which form individual capacity detectors, similar to the capacity detectors discussed in the preceding sections, and are coupled to a central controller 614 similar to the processor discussed in the preceding sections. However, it should be noted that in some implementations, a single generator can be used to generate a common acoustic signal. In some implementations, the acoustic signal generator can be coupled to the individual stores via a manifold comprising an excitation chamber and three waveguides, each waveguide itself comprising an excitation end, a horn end, and a conduit interconnecting the horn and excitation ends.

In one aspect, each of the capacity detectors are arranged to measure (a) the available capacity of the cup store 602, (b) the level of liquid in the overspill container 612, and (c) the level of liquid dispensed into a cup 608. In some aspects, the controller can be coupled to a modem 616 which can communicate with a remote network to report system events. For example, the controller can be configured to push alerts of overspill or underfill events to a remote server in order to alert service personnel that servicing of the machine will soon be required. However, it should be noted that, in some implementations, the controller can be configured for polling of event conditions without departing from the spirit and scope of the present disclosure.

In some implementations, the capacity detector can be used as part of a feedback loop to dispense a controlled quantity of liquid into a cup. For example, the controller can be configured to measure the available capacity of a cup during the course of a dispensing operation, and to terminate the dispensing operation when it is determined that the liquid has reached a predetermined level. Advantageously, such a configuration can desensitize the system to variations in liquid pressure which can in turn cause variations in the quantity of liquid dispensed.

Figure 19:
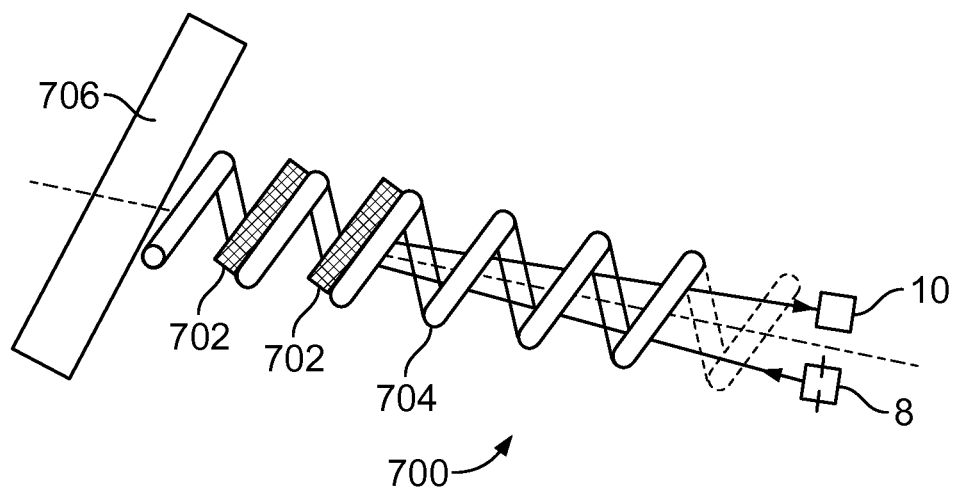
FIG. 19 is a plan view of a product dispenser of a vending machine according to an embodiment.

In some implementations, the capacity detector disclosed herein can be used to measure the available capacity of products (e.g. canned goods) in a product store. For example, referring to FIG. 19, a product dispenser 700 comprises a helical structure 704 which is configured to rotate about an axis. In one aspect, products 702 are disposed on successive turns of the helical structure 704, and are collectively moved towards the aperture 706 each time the helical structure 704 is rotated one turn, thereby dispensing the endmost product from the aperture 706 each time the helical structure 704 is rotated one turn.

In some implementations, a capacity detector comprising an acoustic signal generator and sensor 8 and 10 along the axis of the helical structure 704. In one aspect, the capacity detector can be configured to compute at least one parameter of the product store (e.g. available capacity) by measuring the time delay between the acoustic signal and the return signal generated in response to a reflection of the acoustic signal by the last product held in the helical structure 704. In some implementations, a processor can be configured to inhibit the vending of additional product after it has been determined that the products are sold out. The processor can also be configured to repeat a vend instruction if it is determined that the available capacity did not appropriately change in response to receiving an initial vend instruction.

The sensing apparatus and methods described herein are illustrative in nature and are not meant to be limiting in any way. Those of skill in the art will appreciate variations which do not deviate from the scope of the disclosure herein, which are encompassed by this disclosure.

What is claimed is:

1. A coin storage capacity detector, the capacity detector comprising:
at least one waveguide, each waveguide further comprising:
an excitation end configured to receive a transmitted acoustic signal,
a horn end,
a tapered horn interconnected with the horn end, and
a conduit interconnecting the tapered horn and the excitation end;
a coin receptacle disposed adjacent to each horn end and configured to store a coin stack comprising at least one coin, wherein the transmitted acoustic signal is reflected by at least one surface within the coin receptacle thereby causing a reflected acoustic signal;
an acoustic sensor configured to output measurement signals in response to receiving the transmitted acoustic signal or the reflected acoustic signal; and
a processor configured to compute at least one parameter of the coin receptacle in response to receiving the measurement signals.

2. The capacity detector of claim 1, wherein the horn end defines a horn selected from a tapered horn, an exponential horn, a tractrix horn, or a modified tractrix horn.

3. The capacity detector of claim 1, wherein the horn end radius expands gradually to reduce the instantaneous change in acoustic impedance presented to the acoustic signal as it traverses through and exits the waveguide.

4. The capacity detector of claim 1, further comprising
a signal generator configured to transmit an acoustic signal, and
wherein the horn end is configured to minimize internal reflection of the acoustic signal.

5. The capacity detector of claim 1, wherein the horn end is a tractrix horn or a modified tractrix horn having a mouth end radius of about 3-20 mm.

6. The capacity detector of claim 1, wherein the horn end defines a tractrix horn that comprises a mouth end having a radius $r_0$.

7. The capacity detector of claim 1, wherein the horn end comprises a signal cavity configured to minimize an instantaneous acoustical impedance mismatch between the waveguide impedance and the coin receptacle.

8. The capacity detector of claim 1, wherein the horn end comprises a signal cavity, at least a portion of the cavity varying according to an exponential function.

9. The capacity detector of claim 1, wherein the excitation end is disposed proximate to a spark gap for generating the acoustic signal.

10. The capacity detector of claim 1, wherein the acoustic signal is generated by a spark.

11. The capacity detector of claim 1, wherein the acoustic signal comprises a broadband pulse.

12. The capacity detector of claim 1, wherein the waveguide is configured to couple the acoustic signal to a coin receptacle.

13. The capacity detector of claim 1, wherein the at least one parameter comprises a height of the stack.

14. The capacity detector of claim 1, wherein the at least one parameter comprises the available capacity of the coin receptacle.

15. The capacity detector of claim 1, wherein said at least one parameter comprises a distance between the at least one surface of the stack and the acoustic sensor.

16. The capacity detector of claim 1, wherein the acoustic sensor comprises a microphone.

17. The capacity detector of claim 1, wherein the at least one surface comprises a surface of the uppermost coin in the stack.

18. The capacity detector of claim 1, wherein the acoustic sensor comprises an analog to digital converter configured to output digital measurement signals.

19. The capacity detector of claim 1, wherein the processor is configured to compute a time delay between the transmitted and reflected signals.

20. The capacity detector of claim 19, wherein the computation of the at least one parameter is based upon the time delay.

21. A coin storage capacity detector, the capacity detector comprising:
at least one waveguide, each waveguide further comprising:
an excitation end configured to receive a transmitted acoustic signal,
a horn end comprising a mouth end having a radius $r_0$, wherein the horn end radius $r_d$ at a given displacement d with respect to the mouth end is given by a formula $$d = r_0 \times \ln\left(\frac{r_0 + \sqrt{r_0^2 - r_d^2}}{r_d}\right) - \sqrt{r_0^2 - r_d^2},$$

and
a conduit interconnecting the horn end and the excitation end;
a coin receptacle disposed adjacent to each horn end and configured to store a coin stack comprising at least one coin, wherein the transmitted acoustic signal is reflected by at least one surface within the coin receptacle thereby causing a reflected acoustic signal;
an acoustic sensor configured to output measurement signals in response to receiving the transmitted acoustic signal or the reflected acoustic signal; and
a processor configured to compute at least one parameter of the coin receptacle in response to receiving the measurement signals.

22. A coin storage capacity detector, the capacity detector comprising:
at least one waveguide, each waveguide further comprising:
an excitation end configured to receive a transmitted acoustic signal,
a horn end comprising a signal cavity having a taper angle θ, a mouth end radius $r_0$, and an inner radius $r_d$ which varies at a given displacement d with respect to the mouth end according to a formula given by $$r_d = r_0 - \frac{d}{\tan\theta},$$

and
a conduit interconnecting the horn end and the excitation end;
a coin receptacle disposed adjacent to each horn end and configured to store a coin stack comprising at least one coin, wherein the transmitted acoustic signal is reflected by at least one surface within the coin receptacle thereby causing a reflected acoustic signal;
an acoustic sensor configured to output measurement signals in response to receiving the transmitted acoustic signal or the reflected acoustic signal; and
a processor configured to compute at least one parameter of the coin receptacle in response to receiving the measurement signals.

23. A method of sensing a capacity of a coin receptacle, the method comprising:
coupling a transmitted acoustic signal to a coin receptacle, by a waveguide, wherein the waveguide comprises: an excitation end configured to receive the transmitted acoustic signal, a horn end, a tapered horn interconnected with the horn end, and a conduit interconnecting the tapered horn and the excitation end, and wherein the coin receptacle is configured to store a coin stack comprising at least one coin;
receiving samples of the acoustic signal and a return signal, wherein the return signal is generated in response to at least one surface within the coin receptacle reflecting the transmitted acoustic signal; and
computing, via a processor, at least one parameter of the coin receptacle based upon a time delay between receiving the transmitted acoustic signal and the return signal.

24. The method of claim 23, wherein the acoustic signal is coupled to the coin receptacle through a waveguide comprising:
an excitation end configured to receive an acoustic signal;
a horn end for disposition adjacent to a coin receptacle;
a conduit interconnecting the horn end and the excitation end.

25. The method of claim 24, wherein the horn end defines a horn selected from a tapered horn, an exponential horn, a tractrix horn, or a modified tractrix horn.

26. The method of claim 24, wherein the horn end radius expands gradually to reduce the instantaneous change in acoustic impedance presented to the acoustic signal as it traverses through and exits the waveguide.

* * * * *